(12) United States Patent
Zhang

(10) Patent No.: US 12,402,041 B2
(45) Date of Patent: Aug. 26, 2025

(54) COMMUNICATION METHOD AND SYSTEM, AND DEVICE

(71) Applicant: Huawei Technologies Co., Ltd., Shenzhen (CN)

(72) Inventor: Hongping Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 410 days.

(21) Appl. No.: 17/661,332

(22) Filed: Apr. 29, 2022

(65) Prior Publication Data

US 2022/0256410 A1 Aug. 11, 2022

Related U.S. Application Data

(63) Continuation of application No. PCT/CN2019/114891, filed on Oct. 31, 2019.

(51) Int. Cl.
| | |
|---|---|
| *H04W 36/00* | (2009.01) |
| *H04W 76/19* | (2018.01) |
| *H04W 76/20* | (2018.01) |
| *H04W 88/06* | (2009.01) |
| *H04W 92/18* | (2009.01) |
| *H04W 92/20* | (2009.01) |

(52) U.S. Cl.
CPC ....... *H04W 36/0061* (2013.01); *H04W 76/19* (2018.02); *H04W 76/20* (2018.02); *H04W 88/06* (2013.01); *H04W 92/18* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2015/0079986 A1 | 3/2015 | Nayak et al. | |
| 2017/0070877 A1 | 3/2017 | Shi et al. | |
| 2017/0171902 A1* | 6/2017 | Tillman | H04W 76/16 |
| 2018/0368018 A1* | 12/2018 | Kim | H04L 69/08 |

(Continued)

FOREIGN PATENT DOCUMENTS

| | | |
|---|---|---|
| CN | 106465134 A | 2/2017 |
| CN | 109076455 A | 12/2018 |

(Continued)

OTHER PUBLICATIONS

VIVO (Moderator), "Report of phase 1 Multi-SIM email discussion", 3GPP TSG-RAN WG Meeting #85, RP-191898, Newport Beach, US, Sep. 16-20, 2019, 36 pages.

(Continued)

*Primary Examiner* — Adnan Baig
(74) *Attorney, Agent, or Firm* — SLATER MATSIL, LLP

(57) ABSTRACT

A terminal device obtains first information or second information, where the terminal device supports a first user identity and a second user identity, the first information includes information about a serving cell of the first user identity, and the second information includes a band combination list or a band list supported by the second user identity; and the terminal device sends the first information or the second information to a first access network device by using the second user identity, where the first access network device is an access network device accessed by the terminal device by using the second user identity.

19 Claims, 10 Drawing Sheets

(56) References Cited

U.S. PATENT DOCUMENTS

| | | | |
|---|---|---|---|
| 2020/0008143 A1* | 1/2020 | Jain | H04W 72/0453 |
| 2020/0112969 A1* | 4/2020 | Dai | H04W 8/24 |
| 2020/0128391 A1* | 4/2020 | Yun | H04W 64/00 |
| 2021/0282103 A1* | 9/2021 | Zhu | H04W 76/15 |

FOREIGN PATENT DOCUMENTS

| | | |
|---|---|---|
| CN | 112218344 A | 1/2021 |
| EP | 3149988 A | 4/2017 |
| WO | 2015180779 A1 | 12/2015 |
| WO | 2016028455 A1 | 2/2016 |
| WO | 2018141081 A1 | 8/2018 |

OTHER PUBLICATIONS

3rd Generation Partnership Project; Technical Specification Group Radio Access Network; NR; User Equipment (UE) radio transmission and reception; Part 1: Range 1 Standalone (Release 16), 3GPP TS 38.101-1 V16.1.0 (Sep. 2019), 280 pages.

* cited by examiner

COMMUNICATION METHOD AND SYSTEM, AND DEVICE

CROSS-REFERENCE TO RELATED APPLICATIONS

This application is a continuation of International Application No. PCT/CN2019/114891, filed on Oct. 31, 2019, the disclosure of which is hereby incorporated by reference in its entirety.

TECHNICAL FIELD

This application relates to the communication field, and in particular, to a communication method and system, and a device.

BACKGROUND

Currently, an increasing quantity of terminal devices support a dual subscriber identity module (SIM) dual active (DSDA) mode. The DSDA mode means that two SIM cards may be mounted on a terminal device, that is, the terminal device supports two user identities (where one SIM card corresponds to one user identity), and the two SIM cards may be simultaneously in a connected state, that is, the terminal device may send and receive data by using both the two user identities.

A terminal device in the DSDA mode may send and receive data by using both two user identities. However, because a carrier aggregation capability supported by a hardware resource of the terminal device is fixed, carrier aggregation capabilities of two SIM cards restrict each other. A carrier aggregation capability of a SIM card is specifically represented as an available band of the SIM card. A combination of bands occupied by the two SIM cards of the terminal device needs to be a band combination in a band combination list supported by the terminal device. In a conventional technology, a band that can be occupied by each SIM card of a terminal device in a DSDA mode can be specified only through fixed division. However, this fixed division greatly restricts the available band of each SIM card of the terminal device, and further restricts a data transmission speed of the terminal device.

Therefore, how to coordinate carrier aggregation capabilities of two SIM cards of a terminal device in a DSDA mode to improve a data transmission speed of the terminal device in the DSDA mode and provide better user experience for a user is an urgent problem to be resolved currently.

SUMMARY

Embodiments of this application provide a communication method and system, and a device, to coordinate carrier aggregation capabilities of two SIM cards of a terminal device in a DSDA mode, increase a data transmission speed of the terminal device in the DSDA mode, and improve user experience.

To achieve the foregoing objectives, the following technical solutions are used in embodiments of this application.

According to a first aspect, a communication method is provided. The method includes: A terminal device obtains first information or second information, where the terminal device supports a first user identity and a second user identity, the first information includes information about a serving cell of the first user identity, and the second information includes a band combination list or a band list supported by the second user identity; and the terminal device sends the first information or the second information to a first access network device by using the second user identity, where the first access network device is an access network device accessed by the terminal device by using the second user identity. In this embodiment of this application, the terminal device obtains the first information including the information about the serving cell of the first user identity, and then sends the first information to the first access network device by using the second user identity. Therefore, the first access network device can receive the first information from the terminal device, and determine the information about the serving cell of the first user identity based on the first information, to comprehensively consider the serving cell of the first user identity and a serving cell of the second user identity, and add the serving cell for the second user identity. In other words, in this embodiment of this application, the terminal device can report a band occupied by one SIM card (for example, a SIM card A) to an access network device accessed by another SIM card (for example, a SIM card B). Therefore, the access network device accessed by the SIM card B can dynamically adjust, based on information about the band occupied by the SIM card A, an available band of the SIM card B, to coordinate carrier aggregation capabilities of the two SIM cards. This avoids a limitation, in a conventional technology, on a data transmission speed of the terminal device caused by specifying, through fixed division, a band that can be occupied by each SIM card, to increase the data transmission speed of the terminal device and improve user experience. Alternatively, in this embodiment of this application, the terminal device obtains the second information including the band combination list or the band list supported by the second user identity, and then sends the second information to the first access network device by using the second user identity. Therefore, the first access network device can receive the second information from the terminal device, and add a serving cell for the second user identity based on the second information. Because the terminal device has considered the information about the serving cell of the first user identity when obtaining the second information, the first access network device may configure the serving cell for the second user identity based on the second information. In other words, in this embodiment of this application, the terminal device may determine an available band of one SIM card (namely, a SIM card B) based on a band occupied by another SIM card (for example, a SIM card A), to coordinate carrier aggregation capabilities of the two SIM cards. In this way, an access network device accessed by the SIM card B can obtain the available band of the SIM card B, to add the serving cell for the second user identity based on this. This avoids a limitation, in a conventional technology, on a data transmission speed of the terminal device caused by specifying, through fixed division, a band that can be occupied by each SIM card, to increase the data transmission speed of the terminal device and improve user experience.

In a possible design, the method further includes: The terminal device sends a radio resource control (RRC) setup request message to the first access network device by using the second user identity; the terminal device receives an RRC setup message from the first access network device by using the second user identity; and that the terminal device sends the first information or the second information to a first access network device by using the second user identity includes: The terminal device sends an RRC setup complete message to the first access network device by using the second user identity, where the RRC setup complete message carries the first information or the second information. Based on this solution, when the second user identity of the terminal device enters a connected state from an idle state, the terminal device may send the first information or the second information to the first access network device by using the RRC setup complete message.

In another possible design, the method further includes: The terminal device sends an RRC resume request message to the first access network device by using the second user identity; the terminal device receives an RRC resume message from the first access network device by using the second user identity; and that the terminal device sends the first information or the second information to a first access network device by using the second user identity includes: The terminal device sends an RRC resume complete message to the first access network device by using the second user identity, where the RRC resume complete message carries the first information or the second information. Based on this solution, when the second user identity of the terminal device enters a connected state from an inactive state, the terminal device may send the first information or the second information to the first access network device by using the RRC resume complete message.

In still another possible design, that the terminal device sends the first information or the second information to a first access network device by using the second user identity includes: When the information about the serving cell of the first user identity is changed, the terminal device sends user equipment assistance information to the first access network device by using the second user identity, where the user equipment assistance information carries the first information or the second information. Based on this solution, when the information about the serving cell of the first user identity of the terminal device is changed, the terminal device may send the first information or the second information to the first access network device by using the user equipment assistance information.

In a possible design, the information about the serving cell of the first user identity includes third information of each serving cell of the first user identity, and the third information includes at least one of the following information: band information, a synchronization signal block frequency, cell identifier information, bandwidth information, bandwidth part configuration information, and RRC status information.

In a possible design, that the information about the serving cell of the first user identity is changed includes: At least one piece of information in third information of at least one serving cell of the first user identity is changed.

According to a second aspect, a communication method is provided. The method includes: A first access network device receives first information or second information sent by a terminal device by using a second user identity, where the terminal device supports a first user identity and the second user identity, the first information includes information about a serving cell of the first user identity, and the second information includes a band combination list or a band list supported by the second user identity; and the first access network device determines, based on the first information or the second information, whether to add a first cell as a serving cell of the second user identity. For a technical effect brought by the communication method provided in the second aspect, refer to the technical effect brought by the communication method provided in the first aspect. Details are not described herein again.

In a possible design, that the first access network device determines, based on the first information, whether to add a first cell as a serving cell of the second user identity includes: The first access network device determines at least one first band based on the first information, where the at least one first band includes a band corresponding to each of at least one serving cell of the first user identity; and the first access network device determines, based on a band combination list supported by the terminal device, the at least one first band, at least one second band, and a third band corresponding to the first cell, whether to add the first cell as the serving cell of the second user identity, where the at least one second band includes a band corresponding to each of at least one serving cell of the second user identity. Based on this solution, the first access network device may add the serving cell for the second user identity of the terminal device, to increase a data transmission speed of the terminal device and improve user experience.

In another possible design, when the second information includes the band combination list supported by the second user identity, that the first access network device determines, based on the second information, whether to add a first cell as a serving cell of the second user identity includes: The first access network device determines, based on the band combination list supported by the second user identity, at least one second band, and a third band corresponding to the first cell, whether to add the first cell as the serving cell of the second user identity, where the at least one second band includes a band corresponding to each of at least one serving cell of the second user identity. Based on this solution, the first access network device may add the serving cell for the second user identity of the terminal device, to increase a data transmission speed of the terminal device and improve user experience.

In a possible design, when the second information includes the band list supported by the second user identity, that the first access network device determines, based on the second information, whether to use a first cell as a target serving cell to which the second user identity is to be handed over includes: The first access network device determines whether a third band corresponding to the first cell exists in the band list supported by the second user identity; and if the third band exists in the band list supported by the second user identity, the first access network device determines to use the first cell as the target serving cell to which the second user identity is to be handed over; or if the third band does not exist in the band list supported by the second user identity, the first access network device determines not to use the first cell as the target serving cell to which the second user identity is to be handed over. Based on this solution, the first access network device may determine, based on the second information, the target serving cell to which the second user identity of the terminal device is to be handed over.

In another possible design, that the first access network device determines, based on the first information, whether to use a first cell as a target serving cell to which the second user identity is to be handed over includes: The first access network device determines at least one first band based on the first information, where the at least one first band includes a band corresponding to each of at least one serving cell of the first user identity; the first access network device determines whether a band combination consisting of the at least one first band and a third band corresponding to the first cell exists in a band combination list supported by the terminal device; and if the band combination exists in the band combination list supported by the terminal device, the first access network device determines to use the first cell as the target serving cell to which the second user identity is to be handed over; or if the band combination does not exist in the band combination list supported by the terminal device, the first access network device determines not to use the first cell as the target serving cell to which the second user identity is to be handed over. Based on this solution, the first access network device may determine, based on the first information, the target serving cell to which the second user identity of the terminal device is to be handed over.

In a possible design, the method further includes: The first access network device determines to perform a handover on the terminal device; and the first access network device sends a handover request message to a second access network device, where the handover request message carries the first information or the second information, and the second access network device is a target access network device to be accessed by the terminal device by using the second user identity. Based on this solution, the first access network device may send the first information or the second information to the second access network device by using the handover request message, so that after the terminal device is handed over to the second access network device by using the second user identity, the second access network device can add the serving cell for the second user identity of the terminal device based on the first information or the second information.

In a possible design, the method further includes: The first access network device receives an RRC setup request message sent by the terminal device by using the second user identity; the first access network device sends an RRC setup message to the terminal device; and that a first access network device receives first information or second information sent by a terminal device by using a second user identity includes: The first access network device receives an RRC setup complete message sent by the terminal device by using the second user identity, where the RRC setup complete message carries the first information or the second information. Based on this solution, the first access network device may receive the RRC setup complete message sent by the terminal device, to obtain the first information or the second information sent by the terminal device.

In another possible design, the method further includes: The first access network device receives an RRC resume request message sent by the terminal device by using the second user identity; the first access network device sends an RRC resume message to the terminal device; and that a first access network device receives first information or second information sent by a terminal device by using a second user identity includes: The first access network device receives an RRC resume complete message sent by the terminal device by using the second user identity, where the RRC resume complete message carries the first information or the second information. Based on this solution, the first access network device may receive the RRC resume complete message sent by the terminal device, to obtain the first information or the second information sent by the terminal device.

In still another possible design, that a first access network device receives first information or second information sent by a terminal device by using a second user identity includes: The first access network device receives user equipment assistance information sent by the terminal device by using the second user identity, where the user equipment assistance information carries the first information or the second information. Based on this solution, the first access network device may receive the user equipment assistance information sent by the terminal device, to obtain the first information or the second information sent by the terminal device.

In a possible design, the information about the serving cell of the first user identity includes third information of each serving cell of the first user identity, and the third information includes at least one of the following information: band information, a synchronization signal block frequency, cell identifier information, bandwidth information, bandwidth part configuration information, and RRC status information.

According to a third aspect, a terminal device is provided. The terminal device supports a first user identity and a second user identity, and includes a processing module and a transceiver module. The processing module is configured to obtain first information or second information, where the first information includes information about a serving cell of the first user identity, and the second information includes a band combination list or a band list supported by the second user identity. The transceiver module is configured to send the first information or the second information to a first access network device by using the second user identity, where the first access network device is an access network device accessed by the terminal device by using the second user identity.

In a possible design, the transceiver module is further configured to: send a radio resource control RRC setup request message to the first access network device by using the second user identity, and receive an RRC setup message from the first access network device by using the second user identity. That the transceiver module is configured to send the first information or the second information to a first access network device by using the second user identity specifically includes: The transceiver module is configured to send an RRC setup complete message to the first access network device by using the second user identity, where the RRC setup complete message carries the first information or the second information.

In another possible design, the transceiver module is further configured to: send an RRC resume request message to the first access network device by using the second user identity, and receive an RRC resume message from the first access network device by using the second user identity. That the transceiver module is configured to send the first information or the second information to a first access network device by using the second user identity specifically includes: The transceiver module is configured to send an RRC resume complete message to the first access network device by using the second user identity, where the RRC resume complete message carries the first information or the second information.

In still another possible design, that the transceiver module is configured to send the first information or the second information to a first access network device by using the second user identity includes: The transceiver module is configured to: when the information about the serving cell of the first user identity is changed, send user equipment assistance information to the first access network device by using the second user identity, where the user equipment assistance information carries the first information or the second information.

In a possible design, the information about the serving cell of the first user identity includes third information of each serving cell of the first user identity, and the third information includes at least one of the following information: band information, a synchronization signal block frequency, cell identifier information, bandwidth information, bandwidth part configuration information, and RRC status information.

In a possible design, that the information about the serving cell of the first user identity is changed includes: At least one piece of information in third information of at least one serving cell of the first user identity is changed.

According to a fourth aspect, a first access network device is provided. The first access network device includes a transceiver module and a processing module. The transceiver module is configured to receive first information or second information sent by a terminal device by using a second user identity, where the terminal device supports a first user identity and the second user identity, the first information includes information about a serving cell of the first user identity, and the second information includes a band combination list or a band list supported by the second user identity. The processing module is configured to determine, based on the first information or the second information, whether to add a first cell as a serving cell of the second user identity.

In a possible design, the processing module is specifically configured to: determine at least one first band based on the first information, where the at least one first band includes a band corresponding to each of at least one serving cell of the first user identity; and determine, based on a band combination list supported by the terminal device, the at least one first band, at least one second band, and a third band corresponding to the first cell, whether to add the first cell as the serving cell of the second user identity, where the at least one second band includes a band corresponding to each of at least one serving cell of the second user identity.

In another possible design, when the second information includes the band combination list supported by the second user identity, the processing module is specifically configured to: determine, based on the band combination list supported by the second user identity, at least one second band, and a third band corresponding to the first cell, whether to add the first cell as the serving cell of the second user identity, where the at least one second band includes a band corresponding to each of at least one serving cell of the second user identity.

In a possible design, when the second information includes the band list supported by the second user identity, the processing module is specifically configured to: determine whether a third band corresponding to the first cell exists in the band list supported by the second user identity; and if the third band exists in the band list supported by the second user identity, determine to use the first cell as a target serving cell to which the second user identity is to be handed over; or if the third band does not exist in the band list supported by the second user identity, determine not to use the first cell as a target serving cell to which the second user identity is to be handed over.

In another possible design, the processing module is specifically configured to: determine at least one first band based on the first information, where the at least one first band includes a band corresponding to each of at least one serving cell of the first user identity; determine whether a band combination consisting of the at least one first band and a third band corresponding to the first cell exists in a band combination list supported by the terminal device; and if the band combination exists in the band combination list supported by the terminal device, determine to use the first cell as a target serving cell to which the second user identity is to be handed over; or if the band combination does not exist in the band combination list supported by the terminal device, determine not to use the first cell as a target serving cell to which the second user identity is to be handed over.

In a possible design, the transceiver module is further configured to send a handover request message to a second access network device, where the handover request message carries the first information or the second information, and the second access network device is a target access network device to be accessed by the terminal device by using the second user identity.

In a possible design, the transceiver module is further configured to: receive an RRC setup request message sent by the terminal device by using the second user identity, and send an RRC setup message to the terminal device. That the transceiver module is configured to receive first information or second information sent by a terminal device by using a second user identity specifically includes: The transceiver module is configured to receive an RRC setup complete message sent by the terminal device by using the second user identity, where the RRC setup complete message carries the first information or the second information.

In another possible design, the transceiver module is further configured to: receive an RRC resume request message sent by the terminal device by using the second user identity, and send an RRC resume message to the terminal device. That the transceiver module is configured to receive first information or second information sent by a terminal device by using a second user identity specifically includes: The transceiver module is configured to receive an RRC resume complete message sent by the terminal device by using the second user identity, where the RRC resume complete message carries the first information or the second information.

In still another possible design, that the transceiver module is configured to receive first information or second information sent by a terminal device by using a second user identity specifically includes: The transceiver module is configured to receive user equipment assistance information sent by the terminal device by using the second user identity, where the user equipment assistance information carries the first information or the second information.

In a possible design, the information about the serving cell of the first user identity includes third information of each serving cell of the first user identity, and the third information includes at least one of the following information: band information, a synchronization signal block frequency, cell identifier information, bandwidth information, bandwidth part configuration information, and RRC status information.

According to a fifth aspect, a communication apparatus is provided. The communication apparatus includes a processor and an interface circuit. The interface circuit is configured to: receive a signal from a communication apparatus other than the communication apparatus and transmit the signal to the processor, or send, to a communication apparatus other than the communication apparatus, a signal from the processor. The processor is configured to implement the method according to the first aspect or the second aspect by using a logic circuit or by executing code instructions.

In a possible design, the communication apparatus further includes a memory. The memory is configured to store computer instructions. When the processor executes the instructions, the communication apparatus is enabled to perform the method according to the first aspect or the second aspect.

According to a sixth aspect, a communication apparatus is provided. The communication apparatus includes a processor. The processor is configured to: after being coupled to a memory and reading instructions in the memory, perform, according to the instructions, the method according to the first aspect or the second aspect.

In a possible design, the communication apparatus further includes the memory, and the memory is configured to store necessary program instructions and data. When the communication apparatus is a chip system, the communication apparatus may include a chip, or may include the chip and another discrete component.

With reference to the third aspect, the fourth aspect, the fifth aspect, or the sixth aspect, in a possible design, the first communication apparatus may be the terminal device according to the third aspect, a chip or a chip system that may be used in the terminal device according to the third aspect, or an apparatus including the terminal device. Alternatively, the communication apparatus may be the first access network device according to the fourth aspect, a chip or a chip system that may be used in the first access network device according to the fourth aspect, or an apparatus including the first access network device.

According to a seventh aspect, a computer-readable storage medium is provided. The computer-readable storage medium stores instructions. When the instructions are run on a computer, the computer is enabled to perform the method according to the first aspect or the second aspect.

According to an eighth aspect, a computer program product including instructions is provided. When the computer program product runs on a computer, the computer is enabled to perform the method according to the first aspect or the second aspect.

According to a ninth aspect, a communication system is provided. The communication system includes the terminal device according to the third aspect and the first access network device according to the fourth aspect or at least one communication apparatus according to the fifth aspect or the sixth aspect.

For technical effects brought by any one of the designs of the second aspect to the ninth aspect, refer to technical effects brought by different designs of the first aspect. Details are not described herein again.

DETAILED DESCRIPTION OF ILLUSTRATIVE EMBODIMENTS

Figure 1:
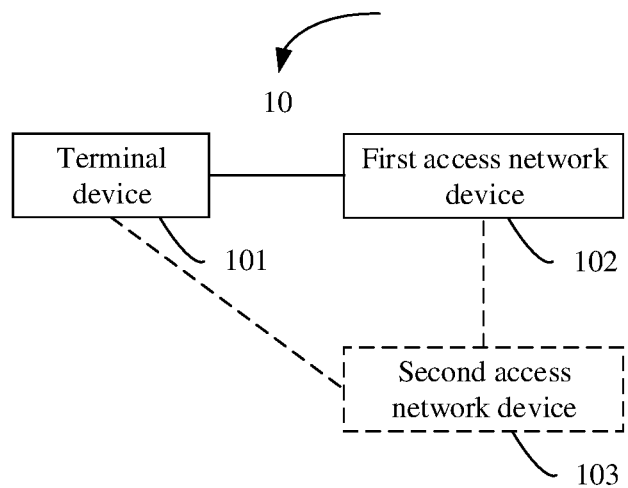
FIG. 1 is a schematic diagram of a structure of a communication system according to an embodiment of this application.

The following describes technical solutions in embodiments of this application with reference to the accompanying drawings in embodiments of this application. In descriptions of this application, "/" represents an "or" relationship between associated objects unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the words such as "first" and "second" do not limit a quantity and an execution sequence, and the words such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be interpreted as being more preferred or having more advantages than another embodiment or design scheme. Exactly, use of the word such as "example" or "for example" is intended to present a relative concept in a specific manner for ease of understanding.

It should be noted that, in embodiments of this application, that one SIM card is mounted on a terminal device is considered as that the terminal device supports one user identity. For example, that two SIM cards are mounted on a terminal device is considered as that the terminal device supports two user identities. There is a one-to-one correspondence between a SIM card and a user identity. In embodiments of this application, an example in which the terminal device supports two user identities is mainly used for description, and the two user identities are respectively referred to as a first user identity and a second user identity. The first user identity may be understood as a user identity used by the terminal device after a SIM card A is mounted, and the second user identity may be understood as a user identity used by the terminal device after a SIM card B is mounted. In other possible embodiments, if more than two SIM cards are mounted on a terminal device, the terminal device supports the more than two user identities. For example, the terminal device supports three user identities, four user identities, or more user identities, and may be registered with more than two networks, where each user identity may be registered with one network. When the terminal device supports more than two identities, for a specific implementation, refer to related descriptions of the implementation in which the terminal device supports two user identities. Details are not described in embodiments of this application.

When a user identity of the terminal device is the first user identity, from the perspective of a network side, the terminal device may be understood as a user (from the perspective of a protocol, the terminal device is a terminal device; for example, referred to as a first user). When a user identity of the terminal device is the second user identity, from the perspective of the network side, the terminal device may be understood as another user (for example, referred to as a second user). The terminal device may be registered with a first network by using the first user identity, and registered with a second network by using the second user identity. In embodiments of this application, that the terminal device supports one user identity may also be described as that the terminal device has one user identity. Similarly, that the terminal device supports two user identities may also be described as that the terminal device has two user identities.

In addition, it should be noted that the "first user identity of the terminal device" described in embodiments of this application may be understood as the "first user identity supported by the terminal device". Content indicated in the two description manners is the same, and the two description manners are interchangeable. Similarly, the "second user identity of the terminal device" may be understood as the "second user identity supported by the terminal device". Content indicated in the two description manners is the same, and the two description manners may be interchanged.

For ease of description, in embodiments of this application, two SIM cards mounted on a terminal device in a DSDA mode are respectively referred to as the SIM card A and the SIM card B. Correspondingly, the terminal device may support two user identities. A user identity corresponding to the SIM card A is referred to as the first user identity, and a user identity corresponding to the SIM card B is referred to as the second user identity.

FIG. 1 shows a communication system 10 according to an embodiment of this application. The communication system 10 includes a terminal device 101 supporting a first user identity and a second user identity and a first access network device 102 accessed by the terminal device by using the second user identity. The terminal device 101 and the first access network device 102 may directly communicate with each other, or may communicate with each other through forwarding by another device. This is not specifically limited in this embodiment of this application.

The terminal device 101 is configured to obtain first information or second information, where the first information includes information about a serving cell of the first user identity, and the second information includes a band combination list or a band list supported by the second user identity. The terminal device 101 is further configured to send the first information or the second information to the first access network device 102 by using the second user identity. The first access network device 102 is configured to: receive the first information or the second information sent by the terminal device 101 by using the second user identity, and determine, based on the first information or the second information, whether to add a first cell as a serving cell of the second user identity. A specific implementation of the foregoing solution is described in detail in subsequent method embodiments. Details are not described herein.

In this embodiment of this application, the terminal device obtains the first information including the information about the serving cell of the first user identity, and then sends the first information to the first access network device by using the second user identity. Therefore, the first access network device can receive the first information from the terminal device, and determine the information about the serving cell of the first user identity based on the first information, to comprehensively consider the serving cell of the first user identity and the serving cell of the second user identity, and add the serving cell for the second user identity. In other words, an access network device corresponding to one SIM card (for example, a SIM card A) of the terminal device can obtain information about a serving cell of another SIM card (namely, a SIM card B), to comprehensively consider information about serving cells of the two SIM cards, and add a new serving cell for a user identity corresponding to the SIM card (namely, the SIM card A). Therefore, in this embodiment of this application, a serving cell that matches a hardware resource of the terminal device can be configured for a user identity corresponding to a SIM card of the terminal device, so that the serving cell configured for the terminal device does not exceed an upper limit that can be supported by the hardware resource of the terminal device, and the hardware resource of the terminal device can be fully used. This avoids a problem in a conventional technology that a hardware resource of a terminal device is not fully used because a serving cell is configured through fixed capability division, to increase a data transmission speed of the terminal device and improve user experience.

Alternatively, in this embodiment of this application, the terminal device obtains the second information including the band combination list or the band list supported by the second user identity, and then sends the second information to the first access network device by using the second user identity. Therefore, the first access network device can receive the second information from the terminal device, and configure the serving cell for the second user identity based on the second information. Because the terminal device has considered the information about the serving cell of the first user identity when obtaining the second information, the first access network device may configure the serving cell for the second user identity based on the second information, so that a quantity of serving cells of the terminal device does not exceed an upper limit that can be supported by a hardware resource of the terminal device, and the hardware resource of the terminal device can be fully used. This avoids a problem in a conventional technology that a hardware resource of a terminal device is not fully used because a serving cell is configured through fixed capability division, to increase a data transmission speed of the terminal device and improve user experience.

Optionally, as shown in FIG. 1, the communication system 10 provided in this embodiment of this application may further include a second access network device 103. The second access network device 103 is a target access network device to be accessed by the terminal device 101 by using the second user identity.

The first access network device 102 is further configured to: determine to perform a handover on the terminal device 101, and send a handover request message to the second access network device 103, where the handover request message carries the first information or the second information. The second access network device 103 is configured to receive the handover request message from the first access network device 102. A specific implementation of the foregoing solution is described in detail in subsequent method embodiments. Details are not described herein.

Based on the communication system 10, after the first access network device 102 determines to hand over the terminal device to a cell of the second access network device 103, the second access network device 103 may obtain the first information or the second information by using the handover request message, and may add the serving cell for the second user identity of the terminal device 101 based on the first information or the second information.

Optionally, the communication system 10 shown in FIG. 1 may be used in various communication systems, for example, a global system for mobile communications (GSM), a code division multiple access (CDMA) system, a wideband code division multiple access (WCDMA) system, a general packet radio service (GPRS) system, a 4th generation (4G) network, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, another future network, or the like. This is not limited in this embodiment of this application.

Figure 2:
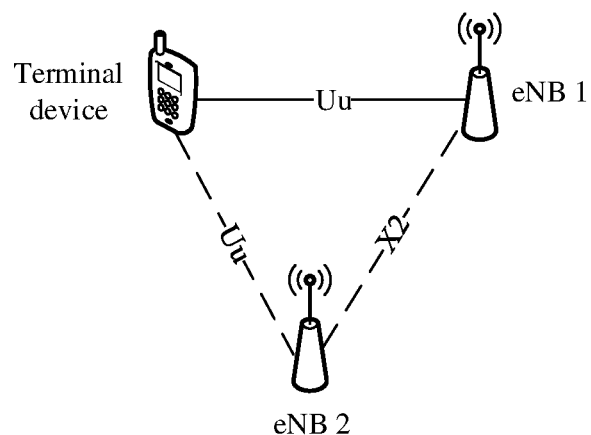
FIG. 2 is a schematic diagram of an architecture of an existing 4G network.

For example, assuming that the communication system 10 shown in FIG. 1 is used in a current 4G network, as shown in FIG. 2, a network element or an entity corresponding to the terminal device 101 may be a terminal device in the 4G network, a network element or an entity corresponding to the first access network device 102 may be an evolved NodeB (eNodeB, or eNB) 1 in the 4G network, and a network element or an entity corresponding to the second access network device 103 may be an eNB 2 in the 4G network.

The terminal device communicates with the eNB 1 or the eNB 2 through a Uu interface, and the eNB 1 communicates with the eNB 2 through an X2 interface. The X2 interface herein may include an X2-C interface and an X2-U interface. The X2-C interface is a control plane interface, and the X2-U interface is a user plane interface.

Figure 3:
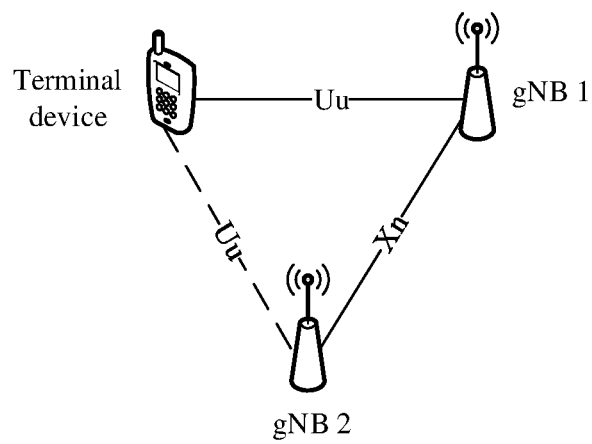
FIG. 3 is a schematic diagram of an architecture of an existing 5G network.

Alternatively, for example, assuming that the communication system 10 shown in FIG. 1 is used in a current 5G network, as shown in FIG. 3, a network element or an entity corresponding to the terminal device 101 may be a terminal device in the 5G network, a network element or an entity corresponding to the first access network device 102 may be a next generation NodeB (gNB) 1 in the 5G network, and a network element or an entity corresponding to the second access network device 103 may be a gNB 2 in the 5G network.

The terminal device communicates with the gNB 1 or the gNB 2 through a Uu interface, and the gNB 1 communicates with the gNB 2 through an Xn interface. The Xn interface herein may include an Xn-U interface and an Xn-C interface. The Xn-C interface is a control plane interface, and the Xn-U interface is a user plane interface.

Optionally, a related function of the terminal device 101 or the first access network device 102 in this embodiment of this application may be implemented by one device, may be jointly implemented by a plurality of devices, or may be implemented by one or more function modules in one device. This is not specifically limited in this embodiment of this application. It may be understood that the foregoing function may be a network element in a hardware device, a software function running on dedicated hardware, a combination of hardware and software, or a virtualization function instantiated on a platform (for example, a cloud platform).

Figure 4:
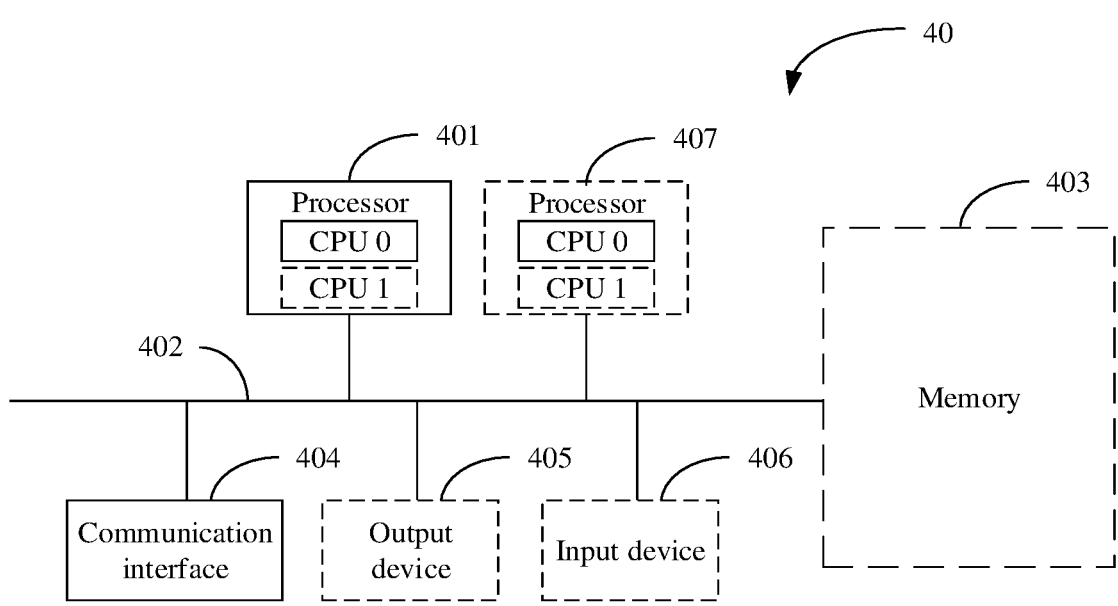
FIG. 4 is a schematic diagram of a structure of a communication device according to an embodiment of this application.

For example, the related function of the terminal device 101 or the first access network device 102 in this embodiment of this application may be implemented by a communication apparatus 40 in FIG. 4. FIG. 4 is a schematic diagram of a structure of the communication apparatus 40 according to an embodiment of this application. The communication apparatus 40 includes one or more processors 401, a communication line 402, and at least one communication interface (in FIG. 4, an example in which a communication interface 404 and one processor 401 are included is merely used for description), and optionally, may further include a memory 403.

The processor 401 may be a general-purpose central processing unit (CPU), a microprocessor, an application-specific integrated circuit (ASIC), or one or more integrated circuits for controlling program execution of the solutions of this application.

The communication line 402 may include a path for connecting different components.

The communication interface 404 may be a transceiver module, configured to communicate with another device or a communication network, such as the Ethernet, a RAN, or a wireless local area network (WLAN). For example, the transceiver module may be an apparatus such as a transceiver or a transceiver. Optionally, the communication interface 404 may alternatively be a transceiver circuit located in the processor 401, and is configured to implement signal input and signal output of the processor.

The memory 403 may be an apparatus having a storage function. For example, the memory 403 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor through the communication line 402. Alternatively, the memory may be integrated with the processor.

The memory 403 is configured to store computer-executable instructions for executing the solutions in this application, and the processor 401 controls execution. The processor 401 is configured to execute the computer-executable instructions stored in the memory 403, to implement communication methods provided in embodiments of this application.

Alternatively, in this embodiment of this application, the processor 401 may implement a processing-related function in the communication methods provided in the following embodiments of this application, and the communication interface 404 is responsible for communicating with another device or a communication network. This is not specifically limited in this embodiment of this application.

The computer-executable instructions in this embodiment of this application may also be referred to as application program code. This is not specifically limited in this embodiment of this application.

During specific implementation, in an embodiment, the processor 41 may include one or more CPUs, for example, a CPU 0 and a CPU 1 in FIG. 4.

During specific implementation, in an embodiment, the communication apparatus 40 may include a plurality of processors, for example, the processor 401 and a processor 407 in FIG. 4. Each of the processors may be a single-core (single-CPU) processor, or may be a multi-core (multi-CPU) processor. The processor herein may be one or more devices, circuits, and/or processing cores for processing data (for example, computer program instructions).

During specific implementation, in an embodiment, the communication apparatus 40 may further include an output device 405 and an input device 406. The output device 405 communicates with the processor 401, and may display information in a plurality of manners.

The communication apparatus 40 may be a general-purpose apparatus or a dedicated apparatus. This is not specifically limited in this embodiment of this application.

Optionally, the terminal device in this embodiment of this application may be a device configured to implement a wireless communication function, for example, a terminal or a chip that may be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). An access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. The terminal may be mobile or at a fixed location.

Optionally, an access network device in this embodiment of this application is a device that enables a terminal device to access a wireless network, and may be an eNB in a 4G network, a gNB in a 5G network, a base station in a future evolved PLMN, a broadband network gateway (BNG), an aggregation switch, a non-3rd generation partnership project (3GPP) access device, or the like. This is not specifically limited in this embodiment of this application. Optionally, a base station in this embodiment of this application may include base stations in various forms, for example, a macro base station, a micro base station (which is also referred to as a small cell), a relay station, and an access point. This is not specifically limited in this embodiment of this application.

For example, the communication methods provided in embodiments of this application may be applied to the following three scenarios:

Scenario 1: A user identity corresponding to one SIM card of a terminal device enters a connected state from an idle state or an inactive state, and a user identity corresponding to another SIM card is in the connected state, the idle state, or the inactive state. For example, a second user identity corresponding to a SIM card B enters the connected state from the idle state, and a first user identity corresponding to a SIM card A is in the connected state.

Scenario 2: A user identity corresponding to one SIM card of a terminal device is in a connected state, and information about a serving cell of another SIM card is changed. For example, a second user identity corresponding to a SIM card B is in the connected state, and information about a serving cell of a SIM card A is changed. For descriptions of the information about the serving cell, refer to related descriptions in the embodiment shown in FIG. 5. Details are not described herein.

Scenario 3: When a user identity corresponding to a SIM card of a terminal device is in a connected state, the user identity corresponding to the SIM card is handed over from an original serving cell to a target serving cell. For example, when a second user identity corresponding to a SIM card B is in the connected state, the second user identity is handed over from an original serving cell to a target serving cell (namely, the first cell in embodiments of this application).

Certainly, it should be noted that the foregoing scenarios are merely example scenarios listed to help understand the solutions in embodiments of this application, and constitute no limitation on this application. It may be understood that, when a serving cell of a user identity corresponding to a SIM card of the terminal device is changed (for example, one or more serving cells are replaced, added, or deleted), or information about a serving cell of a user identity corresponding to a SIM card is partially changed and the changed information about the serving cell may affect a configuration of a serving cell of a user identity corresponding to another SIM card, even if in a scenario that does not belong to the foregoing three scenarios, a new serving cell may still be added for the second user identity by using the communication methods provided in embodiments of this application. This is not specifically limited in this application.

The following describes the communication methods provided in embodiments of this application in detail with reference to FIG. 1 to FIG. 4.

It should be noted that names of messages between network elements, names of parameters in the messages, or the like in the following embodiments of this application are merely examples, and there may be other names during specific implementation. This is not specifically limited in embodiments of this application.

Figure 5:
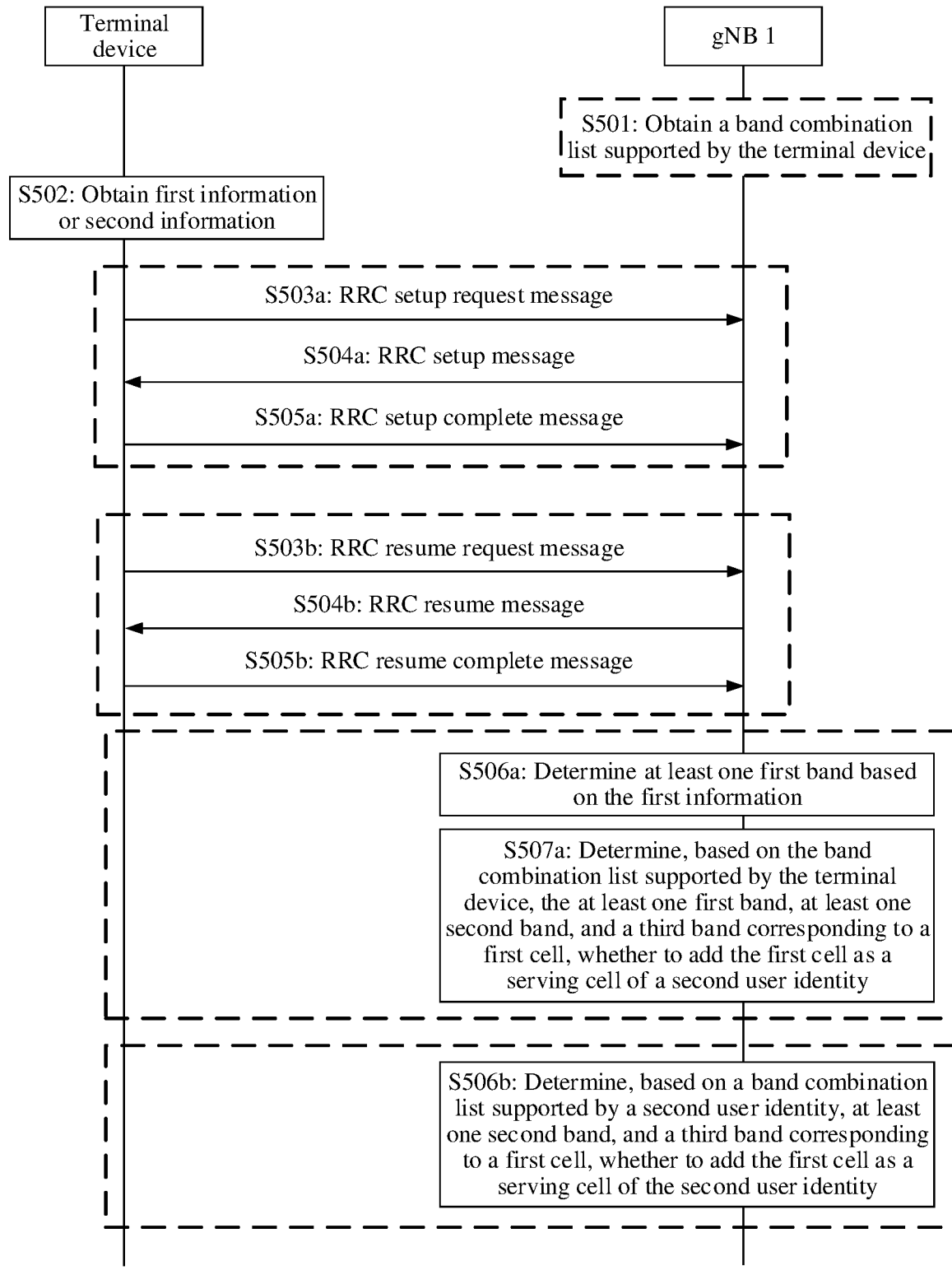
FIG. 5 is a first schematic flowchart of a communication method according to an embodiment of this application.

An example in which an application scenario is the scenario 1, the communication system shown in FIG. 1 is used in the 5G network shown in FIG. 3, and a first access network device is a gNB 1 is used. As shown in FIG. 5, a communication method provided in an embodiment of this application includes the following steps.

S501: Optionally, the gNB 1 obtains a band combination list supported by a terminal device.

The gNB 1 is an access network device accessed by the terminal device by using a second user identity.

It should be noted that the band combination (BC) list supported by the terminal device may also be referred to as a carrier aggregation combination list supported by the terminal device, or briefly referred to as a band combination supported by the terminal device, or the like. The band combination list supported by the terminal device is related to a hardware resource of the terminal device. Different terminal devices may support different band combination lists. A band combination in a band combination list supported by each terminal device indicates a carrier aggregation combination that can be supported by a hardware resource of the terminal device. In other words, the band combination list supported by the terminal device can indicate a carrier aggregation capability of the terminal device. Therefore, the gNB 1 can determine, based on the band combination list supported by the terminal device, whether the terminal device supports addition of a target cell as a serving cell of the terminal device.

Figure 6:
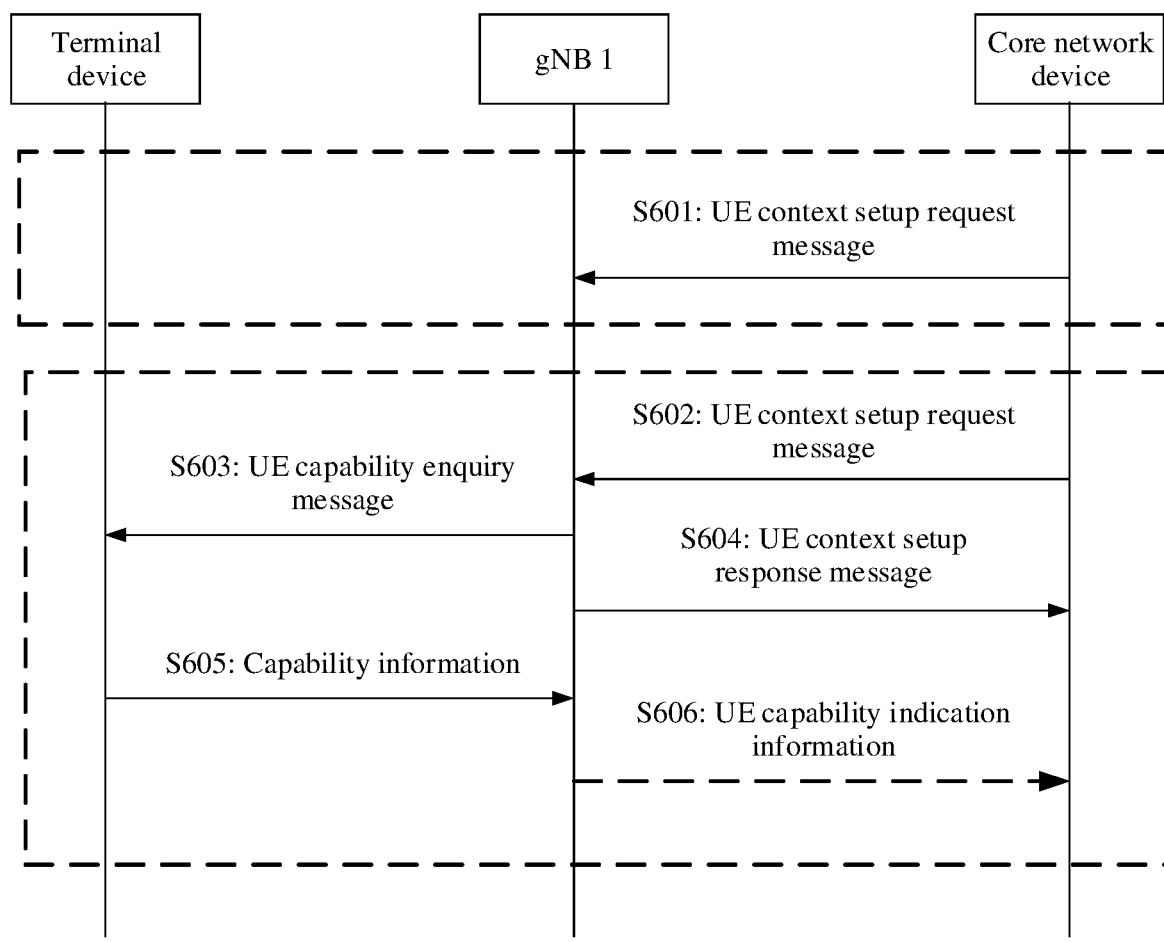
FIG. 6 is a schematic flowchart of a method for obtaining, by a gNB 1, a band combination list supported by a terminal device according to an embodiment of this application.

For example, in a possible implementation, if a core network device stores capability information (including the band combination list supported by the terminal device) of the terminal device, the gNB 1 may obtain, through step S601 in FIG. 6, the band combination list supported by the terminal device. Step S601 is as follows:

S601: The core network device sends a UE context setup request message to the gNB 1, where the message carries the band combination list supported by the terminal device. The gNB 1 receives the UE context setup request message from the core network device.

Optionally, in this embodiment of this application, after receiving the UE context setup request message from the core network device, the gNB 1 may store the capability information of the terminal device. This is not specifically limited in this embodiment of this application.

For example, in another possible implementation, if a UE context setup request message does not carry capability information of the terminal device, the gNB 1 may obtain, through steps S602 to S605 in FIG. 6, the band combination list supported by the terminal device. Steps S602 to S605 are as follows.

S602: A core network device sends the UE context setup request message to the gNB 1, and the gNB 1 receives the UE context setup request message from the core network device.

S603: The gNB 1 determines that the UE context setup request message does not include the capability information of the terminal device, and sends a UE capability information enquiry (UE capability enquiry) message to the terminal device. The terminal device receives the UE capability information enquiry message from the gNB 1.

S604: The gNB 1 sends a UE context setup response message to the core network device, and the core network device receives the UE context setup response message from the gNB 1.

S605: The terminal device sends the capability information of the terminal device to the gNB 1, where the capability information includes the band combination list supported by the terminal device. The gNB 1 receives the capability information from the terminal device.

Optionally, in this embodiment of this application, after receiving the capability information from the terminal device, the gNB 1 may store the capability information of the terminal device. This is not specifically limited in this embodiment of this application.

According to the foregoing steps S602 to S605, the gNB 1 may obtain the band combination list supported by the terminal device. If the terminal device is subsequently handed over out of a service scope of the gNB 1 and is connected to another gNB, to help the another gNB obtain the band combination list supported by the terminal device, in this embodiment of this application, after step S605, the method may further include the following step S606.

S606: The gNB 1 sends a UE capability indication message to the core network device, where the message carries the capability information of the terminal device. The core network device receives the UE capability indication message from the gNB 1.

In this way, subsequently, the another gNB may obtain, from the core network device, the band combination list supported by the terminal device.

Optionally, in this embodiment of this application, after receiving the UE capability indication message from the gNB 1, the core network device may further store the capability information of the terminal device. This is not specifically limited in this embodiment of this application.

It should be noted that the methods for obtaining the band combination list supported by the terminal device shown in FIG. 6 are merely example methods provided in this embodiment of this application, and constitute no limitation on this application. A person skilled in the art may alternatively obtain, by using another method, the band combination list supported by the terminal device. This is not specifically limited in this embodiment of this application.

Further, as shown in FIG. 5, when the second user identity of the terminal device enters a connected state from an idle state or an inactive state, the communication method provided in this embodiment of this application may further include the following step S502.

S502: The terminal device obtains first information or second information.

The first information includes information about a serving cell of a first user identity, and the second information includes a band combination list or a band list supported by the second user identity.

Optionally, the information about the serving cell of the first user identity includes third information of each of at least one serving cell of the first user identity. The third information includes at least one of the following information: band information, a synchronization signal block (SSB) frequency, cell identifier information (for example, a physical cell identifier), bandwidth information, bandwidth part (BWP) configuration information, and RRC status information.

How the terminal device obtains the band combination list or the band list supported by the second user identity depends on a specific implementation. For example, in a possible implementation, based on the band combination list supported by the terminal device, a band combination that does not include a band corresponding to the serving cell of the first user identity is first removed. Then, based on remaining band combinations, the band corresponding to the serving cell of the first user identity is deleted, to obtain several band combinations and bands. The band combinations form the band combination list supported by the second user identity, and the bands form the band list supported by the second user identity. A band corresponding to a cell refers to a band to which a physical frequency used by the cell belongs. For example, it is assumed that the band combination list supported by the terminal device is a band combination list shown in FIG. 7(*a*), and the band corresponding to the serving cell of the first user identity is a band 2. A band combination 2 that does not include the band 2 in FIG. 7(*a*) is first removed. Further, on this basis, the band 2 in each remaining band combination is deleted, to obtain several band combinations and bands shown in FIG. 7(*b*). As shown in FIG. 7(*c*), band combinations {band 3, band 4} and {band 1, band 3} in FIG. 7(*b*) form the band combination list supported by the second user identity. As shown in FIG. 7(*d*), bands, namely, a band 1, a band 3, and a band 4 in FIG. 7(*b*) form the band list supported by the second user identity.

In a possible implementation, if the second user identity of the terminal device enters the connected state from the idle state, as shown in FIG. 5, the communication method provided in this embodiment of this application further includes the following steps S503*a* to S505*a*.

S503*a*: The terminal device sends a radio resource control (radio resource control, RRC) setup request message to the gNB 1 by using the second user identity, and the gNB 1 receives the RRC setup request message sent by the terminal device by using the second user identity.

S504a: The gNB 1 sends an RRC setup message to the terminal device, and the terminal device receives the RRC setup message from the gNB 1 by using the second user identity.

S505a: The terminal device sends an RRC setup complete message to the gNB 1 by using the second user identity, and the gNB 1 receives the RRC setup complete message sent by the terminal device by using the second user identity.

The RRC setup complete message carries the first information or the second information.

Alternatively, in another possible implementation, if the second user identity of the terminal device enters the connected state from the inactive state, as shown in FIG. 5, the communication method provided in this embodiment of this application further includes the following steps S503b to S505b.

S503b: The terminal device sends an RRC resume request message to the gNB 1 by using the second user identity, and the gNB 1 receives the RRC resume request message sent by the terminal device by using the second user identity.

S504b: The gNB 1 sends an RRC resume message to the terminal device, and the terminal device receives the RRC resume message from the gNB 1 by using the second user identity.

S505b: The terminal device sends an RRC resume complete message to the gNB 1 by using the second user identity, and the gNB 1 receives the RRC resume complete message sent by the terminal device by using the second user identity.

The RRC resume complete message carries the first information or the second information.

Further, in a possible implementation, if the RRC setup complete message or the RRC resume complete message carries the first information, as shown in FIG. 5, the communication method provided in this embodiment of this application further includes the following steps S506a and S507a.

S506a: The gNB 1 determines at least one first band based on the first information.

The at least one first band includes a band corresponding to each of the at least one serving cell of the first user identity. For example, when the first user identity has three serving cells, assuming that the three serving cells are a cell 1, a cell 2, and a cell 3, the at least one first band includes a band corresponding to the cell 1, a band corresponding to the cell 2, and a band corresponding to the cell 3.

It may be understood that, if two or more of the serving cells of the first user identity correspond to a same band, the band appears in the at least one first band for two or more times. For example, in the foregoing example, if the serving cells 1 and serving cell 2 correspond to a band 1, and the serving cell 3 corresponds to a band 3, the at least one first band includes the band 1, the band 1, and the band 3.

S507a: The gNB 1 determines, based on the band combination list supported by the terminal device, the at least one first band, at least one second band, and a third band corresponding to a first cell, whether to add the first cell as a serving cell of the second user identity.

The at least one second band includes a band corresponding to each of at least one serving cell of the second user identity. Similar to a situation that occurs on the first band, if two or more of the serving cells of the second user identity correspond to a same band, the band appears in the at least one second band for two or more times.

For example, in a possible implementation, step S507a may specifically include: The gNB 1 determines whether a band combination consisting of the at least one first band, the at least one second band, and the third band exists in the band combination list supported by the terminal device. If the band combination exists in the band combination list supported by the terminal device, the gNB 1 determines to add the first cell as the serving cell of the second user identity; or if the band combination does not exist in the band combination list supported by the terminal device, the gNB 1 determines not to add the first cell as the serving cell of the second user identity.

For example, it is assumed that the at least one first band includes a band band 1, the at least one second band includes a band band 2, and the third band corresponding to the first cell is a band 3. If a band combination {band 1, band 2, band 3} exists in the band combination list supported by the terminal device, the gNB 1 determines to add the first cell as one serving cell of the second user identity. On the contrary, if a band combination {band 1, band 2, band 3} does not exist in the band combination list supported by the terminal device, the gNB 1 determines not to add the first cell as the serving cell of the second user identity.

In another possible implementation, if the RRC setup complete message or the RRC resume complete message carries the second information, and the second information includes the band combination list supported by the second user identity, as shown in FIG. 5, the communication method provided in this embodiment of this application further includes the following step S506b.

S506b: The gNB 1 determines, based on the band combination list supported by the second user identity, at least one second band, and a third band corresponding to a first cell, whether to add the first cell as a serving cell of the second user identity.

For example, in a possible implementation, step S506b may specifically include: The gNB 1 determines whether a band combination consisting of the at least one second band, and the third band exists in the band combination list supported by the second user identity. If the band combination exists in the band combination list supported by the second user identity, the gNB 1 determines to add the first cell as the serving cell of the second user identity; or if the band combination does not exist in the band combination list supported by the second user identity, the gNB 1 determines not to add the first cell as the serving cell of the second user identity.

For example, it is assumed that the at least one second band includes a band band 2, and the third band is a band 3. If a band combination {band 2, band 3} exists in the band combination list supported by the second user identity, the gNB 1 determines to add the first cell as one serving cell of the second user identity. On the contrary, if a band combination {band 2, band 3} does not exist in the band combination list supported by the second user identity, the gNB 1 determines not to add the first cell as one serving cell of the second user identity.

It should be noted that, when a serving cell is added for a user identity corresponding to the terminal device, steps S506a and S507a or step S506b in this embodiment of this application may be performed, that is, a single serving cell is added for the corresponding user identity each time; or a plurality of serving cells may be added for the corresponding user identity at a time. This is not specifically limited in this embodiment of this application.

In this embodiment of this application, the terminal device obtains the first information including the information about the serving cell of the first user identity, and then sends the first information to the gNB 1 by using the second user identity. Therefore, the gNB 1 can receive the first information from the terminal device, and determine the information about the serving cell of the first user identity based on the first information, to comprehensively consider the serving cell of the first user identity and the serving cell of the second user identity, and add the serving cell for the second user identity. In other words, in this embodiment of this application, the terminal device can report a band occupied by one SIM card (for example, a SIM card A) to the gNB 1 accessed by another SIM card (for example, a SIM card B). Therefore, the gNB 1 can dynamically adjust, based on information about the band occupied by the SIM card A, an available band of the SIM card B, to coordinate carrier aggregation capabilities of the two SIM cards. This avoids a limitation, in a conventional technology, on a data transmission speed of the terminal device caused by specifying, through fixed division, a band that can be occupied by each SIM card, to increase the data transmission speed of the terminal device and improve user experience.

Alternatively, in this embodiment of this application, the terminal device obtains the second information including the band combination list or the band list supported by the second user identity, and then sends the second information to the gNB 1 by using the second user identity. Therefore, the gNB 1 can receive the second information from the terminal device, and configure the serving cell for the second user identity based on the second information. Because the terminal device has considered the information about the serving cell of the first user identity when obtaining the second information, the gNB 1 may add the serving cell for the second user identity based on the second information. In other words, in this embodiment of this application, the terminal device may determine an available band of one SIM card (namely, a SIM card B) based on a band occupied by another SIM card (for example, a SIM card A), to coordinate carrier aggregation capabilities of the two SIM cards. In this way, the gNB 1 accessed by the SIM card B can obtain the available band of the SIM card B, to add the serving cell for the second user identity based on this. This avoids a limitation, in a conventional technology, on a data transmission speed of the terminal device caused by specifying, through fixed division, a band that can be occupied by each SIM card, to increase the data transmission speed of the terminal device and improve user experience.

An action of the terminal device or the gNB 1 in steps S501 to S507*a* or steps S501 to S506*b* may be performed by the processor 401 in the communication device 400 shown in FIG. 4 by invoking the application program code stored in the memory 403. This is not limited in this embodiment.

Figure 8:
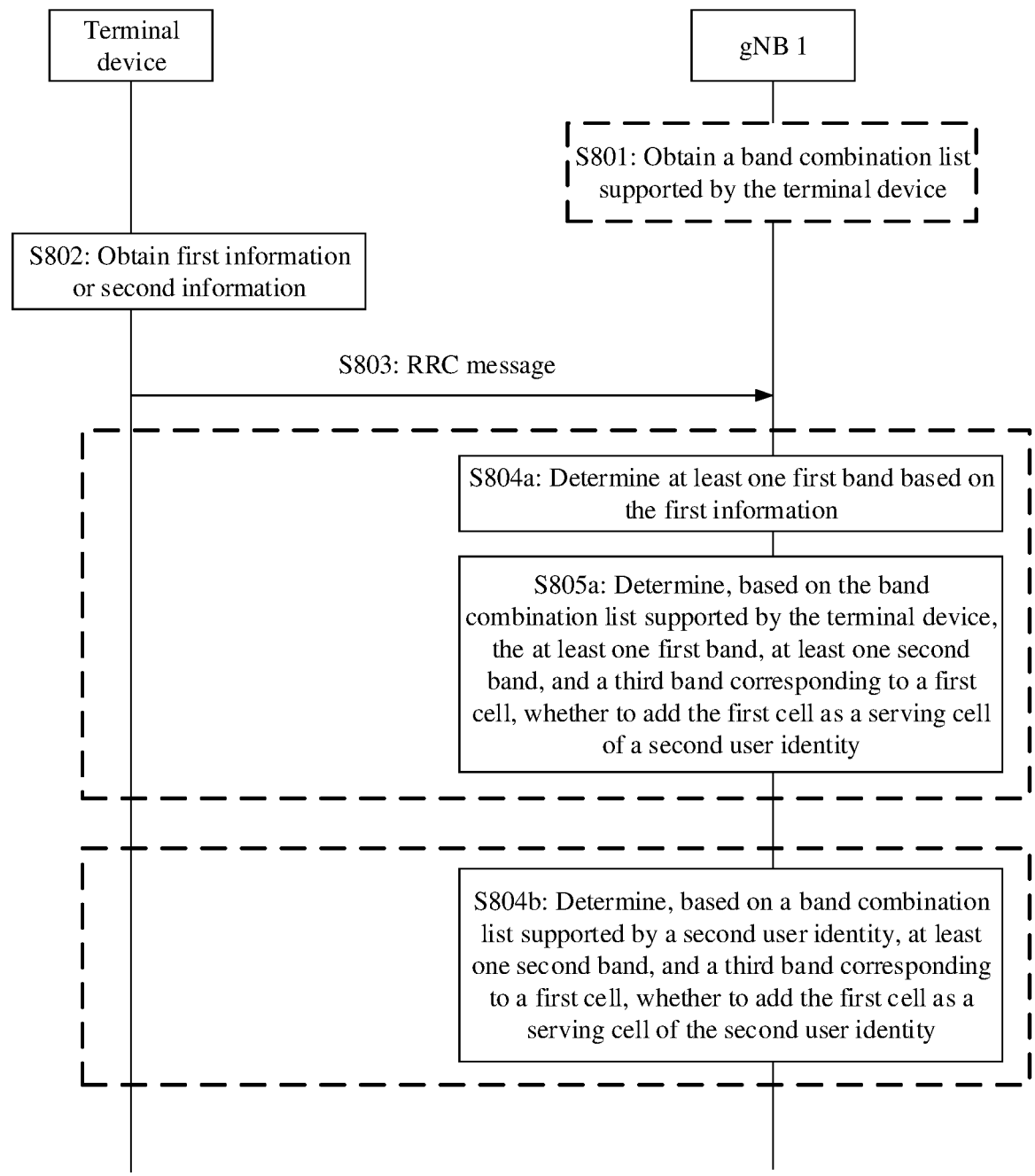
FIG. 8 is a second schematic flowchart of a communication method according to an embodiment of this application.

Alternatively, an example in which an application scenario is the scenario 2, the communication system shown in FIG. 1 is used in the 5G network shown in FIG. 3, and a first access network device is a gNB 1 is used. As shown in FIG. 8, another communication method provided in an embodiment of this application includes the following steps.

S801 and S802 are the same as steps S501 and S502. For related descriptions, refer to the embodiment shown in FIG. 5. Details are not described herein again.

Further, when the information about the serving cell of the first user identity of the terminal device is changed, as shown in FIG. 8, the communication method provided in this embodiment of this application may further include the following step S803.

S803: The terminal device sends an RRC message to the gNB 1 by using the second user identity, and the gNB 1 receives the RRC message sent by the terminal device by using the second user identity.

The RRC message carries the first information or the second information. For example, the RRC message may be, for example, a user equipment assistance information (UE assistance information) message, or may be another RRC message. This is not specifically limited in this embodiment of this application. User equipment assistance information is used by the terminal device to send assistance information to a network device.

Optionally, in this embodiment of this application, that the information about the serving cell of the first user identity is changed may include: At least one piece of information in third information of the at least one serving cell of the first user identity is changed. For example, that at least one piece of information in third information is changed may be, for example, that the cell identifier information of the serving cell of the first user identity is changed (for example, the serving cell of the first user identity is added, deleted, or changed), an RRC status of the first user identity is changed (for example, the first user identity changes from the idle state to an active state), or the BWP configuration information is changed.

For related descriptions of the information about the serving cell of the first user identity, refer to the descriptions in the embodiment shown in FIG. 5.

Optionally, protocol stacks in the terminal device may interact with each other. When the information about the serving cell of the first user identity is changed, a protocol stack corresponding to the first user identity may send changed information to a protocol stack corresponding to the second user identity, to trigger the protocol stack corresponding to the second user identity to perform step S803.

Optionally, if the gNB 1 has obtained the first information or the second information before step S803, the gNB 1 overwrites the previously obtained first information or second information with the first information or the second information obtained in step S803.

In a possible implementation, if the RRC message sent in step S803 carries the first information, as shown in FIG. 8, the communication method provided in this embodiment of this application further includes the following steps S804*a* and S805*a*.

S804*a* and S805*a* are the same as steps S506*a* and S507*a*. For related descriptions, refer to the embodiment shown in FIG. 5. Details are not described herein again.

In another possible implementation, if the RRC message sent in step S803 carries the second information, as shown in FIG. 8, the communication method provided in this embodiment of this application further includes the following step S804*b*.

S804*b* is the same as step S506*b*. For related descriptions, refer to the embodiment shown in FIG. 5. Details are not described herein again.

For a beneficial effect of the communication method shown in FIG. 8 in this embodiment of this application, refer to the descriptions of the communication method shown in FIG. 5. Details are not described herein again.

An action of the terminal device or the gNB 1 in steps S801 to S805*a* or steps S801 to S804*b* may be performed by the processor 401 in the communication device 400 shown in FIG. 4 by invoking the application program code stored in the memory 403. This is not limited in this embodiment.

Figure 9:
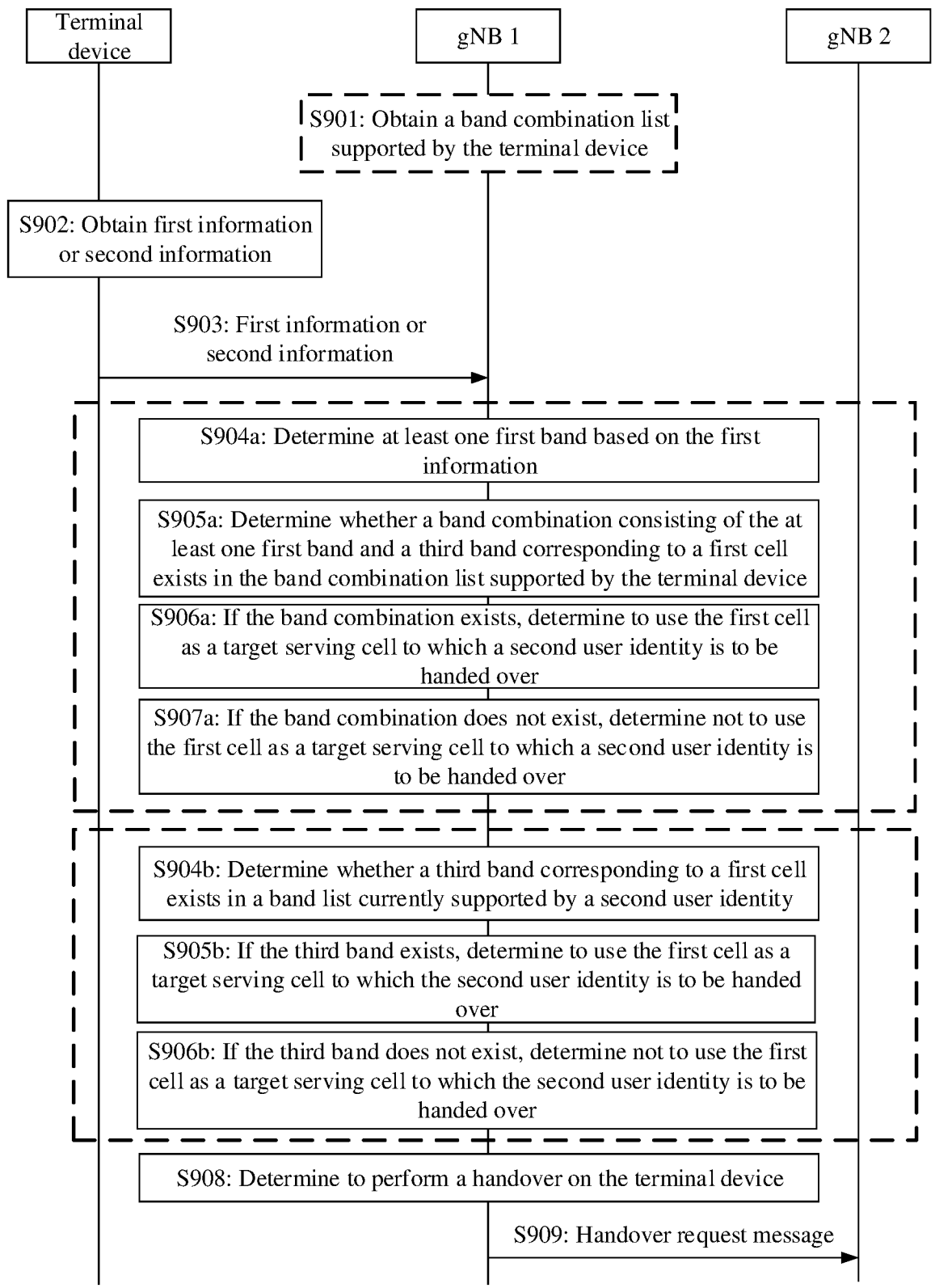
FIG. 9 is a third schematic flowchart of a communication method according to an embodiment of this application.

Alternatively, an example in which an application scenario is the scenario 3, the communication system shown in FIG. 1 is used in the 5G network shown in FIG. 3, a first access network device is a gNB 1, and a second access network device is a gNB 2 is used. As shown in FIG. 9, still another communication method provided in an embodiment of this application includes the following steps.

S901 and S902 are the same as steps S501 and S502. For related descriptions, refer to the embodiment shown in FIG. 5. Details are not described herein again.

S903: The terminal device sends the first information or the second information to the gNB 1 by using the second user identity, and the gNB 1 receives the first information or the second information sent by the terminal device by using the second user identity.

For a specific implementation of step S903, refer to steps S503a to S505a or steps S503b to S505b in the embodiment shown in FIG. 5, or refer to step S803 in the embodiment shown in FIG. 8. Details are not described again in this embodiment of this application.

In a possible implementation, if the gNB 1 receives the first information sent by the terminal device by using the second user identity, as shown in FIG. 9, the communication method provided in this embodiment of this application further includes the following steps S904a to S907a.

S904a: The gNB 1 determines at least one first band based on the first information.

The at least one first band includes a band corresponding to each of the at least one serving cell of the first user identity.

S905a: The gNB 1 determines whether a band combination consisting of the at least one first band and a third band corresponding to a first cell exists in the band combination list supported by the terminal device.

For example, it is assumed that the serving cell of the first user identity is a cell 2, a first band corresponding to the cell 2 is a band 2, and the third band corresponding to the first cell cell 1 is a band 1. In this case, the band combination consisting of the at least one first band and the third band corresponding to the first cell is {band 1, band 2}.

S906a: If the band combination exists in the band combination list supported by the terminal device, the gNB 1 determines to use the first cell as a target serving cell to which the second user identity is to be handed over.

Figure 7A:
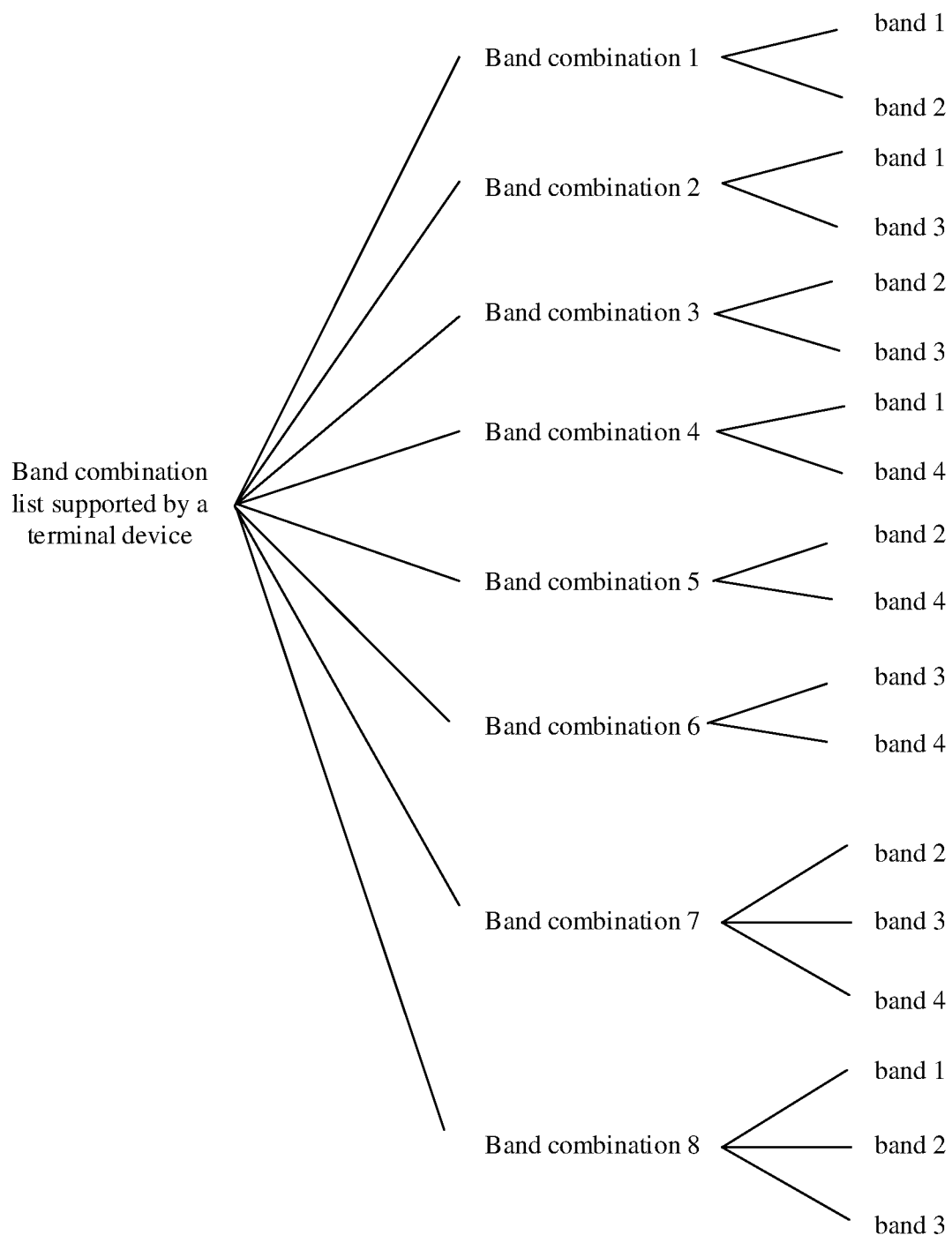
FIG. 7(a) shows an example of a band combination list supported by a terminal device according to an embodiment of this application.
Figure 7B:
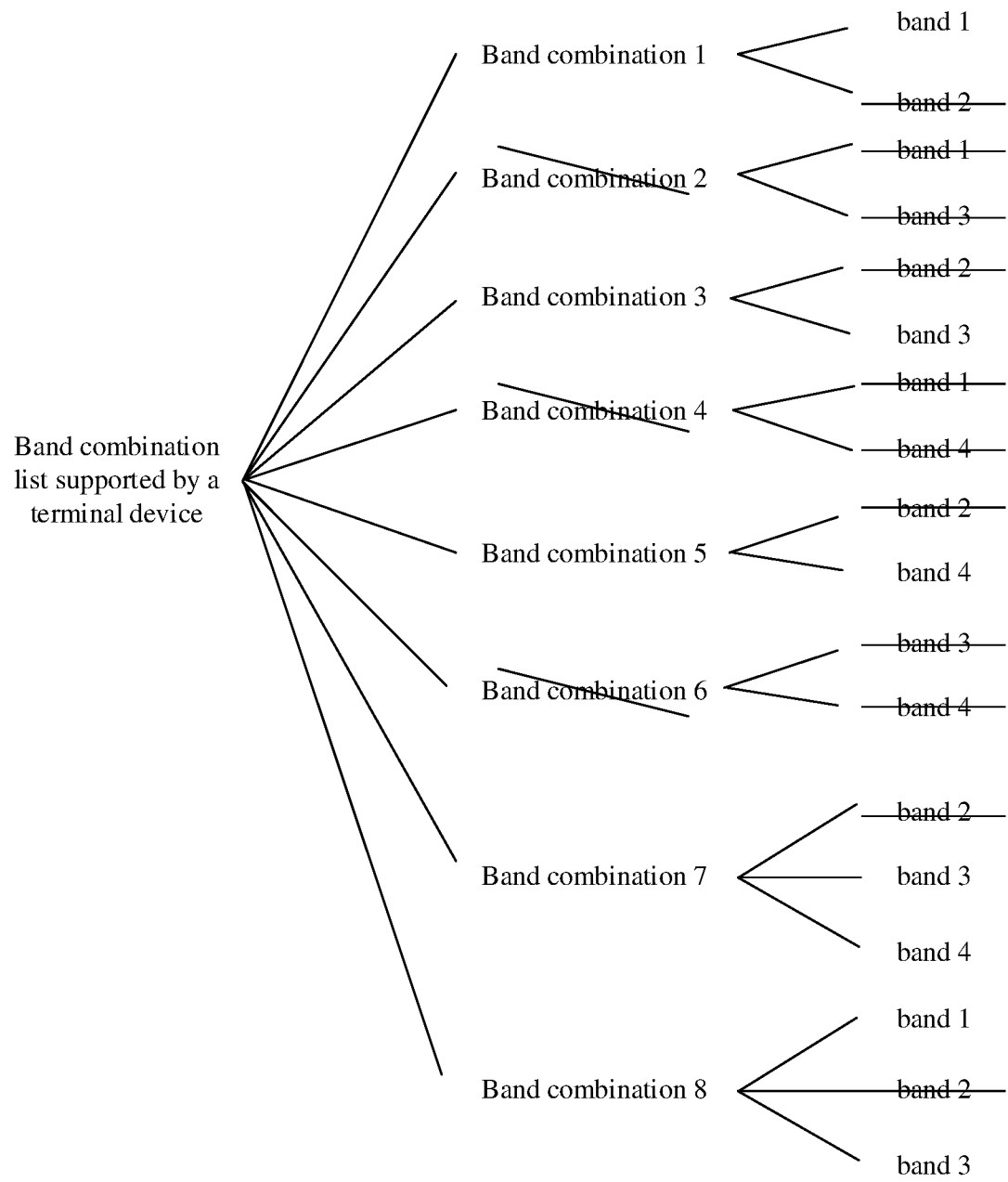
FIG. 7(b) shows an example of a band combination list and a band list that are supported by a second user identity according to an embodiment of this application.
Figure 7C:
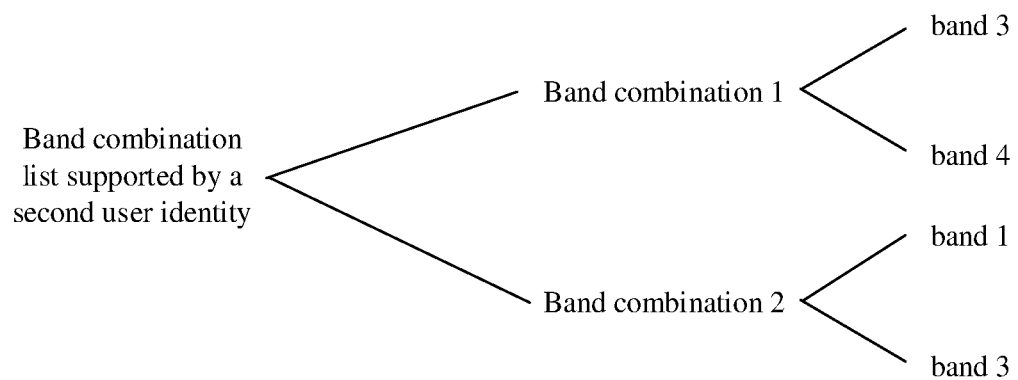
FIG. 7(c) shows an example of a band combination list supported by a second user identity according to an embodiment of this application.

For example, in the foregoing example, it is assumed that the band combination consisting of the at least one first band and the third band corresponding to the first cell is {band 1, band 2}, and the band combination list supported by the terminal device is shown in FIG. 7(a). In this case, because the band combination {band 1, band 2} exists in the band combination list supported by the terminal device, the gNB 1 determines to use the first cell cell 1 as the target serving cell of the second user identity.

S907a: If the band combination does not exist in the band combination list supported by the terminal device, the gNB 1 determines not to use the first cell as a target serving cell to which the second user identity is to be handed over.

In another possible implementation, if the gNB 1 receives the second information sent by the terminal device by using the second user identity, and the second information includes the band list supported by the second user identity, as shown in FIG. 9, the communication method provided in this embodiment of this application further includes the following steps S904b to S906b.

S904b: The gNB 1 determines whether a third band corresponding to the first cell exists in the band list supported by the second user identity.

S905b: If the third band exists in the band list supported by the second user identity, the gNB 1 determines to use the first cell as a target serving cell to which the second user identity is to be handed over.

Figure 7D:
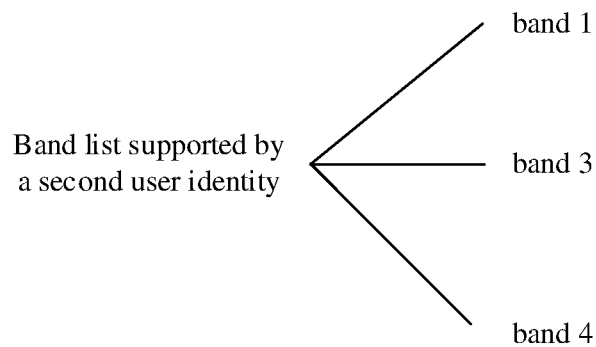
FIG. 7(d) shows an example of a band list supported by a second user identity according to an embodiment of this application.

For example, it is assumed that the band list supported by the second user identity is the band list shown in FIG. 7(d), and the band corresponding to the first cell cell 1 is a band 1. In this case, because the band 1 exists in the band list supported by the second user identity, the gNB 1 determines to use the first cell cell 1 as the target serving cell to which the second user identity is to be handed over.

S906b: If the third band does not exist in the band list supported by the second user identity, the gNB 1 determines not to use the first cell as a target serving cell to which the second user identity is to be handed over.

Further, if the gNB 1 determines not to use the first cell as the target serving cell to which the second user identity is to be handed over, as shown in FIG. 9, the communication method provided in this embodiment of this application further includes the following steps S908 and S909.

S908: The gNB 1 determines to perform a handover on the terminal device.

S909: The gNB 1 sends a handover request message to the gNB 2, where the handover request message carries the first information or the second information. The gNB 2 receives the handover request message from the gNB 1.

The gNB 2 is a target access network device to be accessed by the terminal device by using the second user identity, namely, an access network device to which the first cell (which is also the target serving cell to which the second user identity is to be handed over) belongs.

Further, after obtaining the first information or the second information, the gNB 2 may add a serving cell for the second user identity based on the first information or the second information. For a specific implementation, refer to the implementation in which the gNB 1 adds the serving cell for the second user identity in steps S506a and S507a or step S506b in the embodiment shown in FIG. 5. Details are not described herein again.

Certainly, in this embodiment of this application, the handover request message further includes information about the first cell, and the information about the first cell is used by the gNB 2 to enable the terminal device to camp on the first cell by using the second user identity.

Optionally, in this embodiment of this application, alternatively, a solution in a conventional technology may be used to determine whether to use a first cell as a target serving cell to which the second user identity is to be handed over. If the gNB 1 determines to use the first cell as the target serving cell to which the second user identity is to be handed over, steps S908 and S909 continue to be performed. This is not specifically limited in this embodiment of this application.

Optionally, in this embodiment of this application, the gNB 1 may not determine to perform the handover on the terminal device only when determining to use the first cell as the target serving cell to which the second user identity is to be handed over, but may determine to perform the handover on the terminal device in another manner. This is not specifically limited in this embodiment of this application. In conclusion, in this embodiment of this application, after the gNB 1 receives the first information or the second information from the terminal device, if the gNB 1 determines to perform the handover on the terminal device (for example, hand over the terminal device to a cell served by the gNB 2), the gNB 1 sends the first information or the second information to the gNB 2. Then, the gNB 2 adds the serving cell for the second user identity based on the first information or the second information.

In this embodiment of this application, the gNB 1 receives the first information or the second information from the terminal device, and sends the first information or the second information to the gNB 2 after determining to perform the handover on the terminal device. Therefore, the gNB 2 can obtain the first information or the second information, to add the serving cell for the second user identity based on the first information or the second information. In this embodiment of this application, carrier aggregation capabilities of two SIM cards can be coordinated (for a specific reason, refer to the related descriptions in the communication method shown in FIG. 5). This avoids a limitation, in the conventional technology, on a data transmission speed of the terminal device caused by specifying, through fixed division, a band that can be occupied by each SIM card, to increase the data transmission speed of the terminal device and improve user experience.

An action of the terminal device or the gNB 1 in steps S901 to S909 may be performed by the processor 401 in the communication device 400 shown in FIG. 4 by invoking the application program code stored in the memory 403. This is not limited in this embodiment.

In addition, it should be noted that the embodiments shown in FIG. 5, FIG. 8, and FIG. 9 are all described by using an example in which the communication system shown in FIG. 1 is used in the 5G network architecture shown in FIG. 3. If an example in which the communication system shown in FIG. 1 is used in the 4G network architecture shown in FIG. 2 is used for description, a corresponding communication method is similar to the method in the foregoing embodiments, and only names of related network elements and messages exchanged between the network elements need to be adaptively replaced. Details are not described herein.

It may be understood that in the foregoing embodiments, the methods and/or steps implemented by the terminal device may also be implemented by a component that may be used in the terminal device, and the methods and/or steps implemented by the first access network device may also be implemented by a component that may be used in the first access network device.

The solutions provided in embodiments of this application are mainly described above from the perspective of interaction between network elements. Correspondingly, an embodiment of this application further provides a communication apparatus. The communication apparatus may be the terminal device in the foregoing method embodiments, an apparatus including the terminal device, or a component that may be used in the terminal device. Alternatively, the communication apparatus may be the first access network device in the method embodiments, an apparatus including the first access network device, or a component that may be used in the first access network device. It can be understood that, to implement the foregoing functions, the communication apparatus includes a corresponding hardware structure and/or software module for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 10:
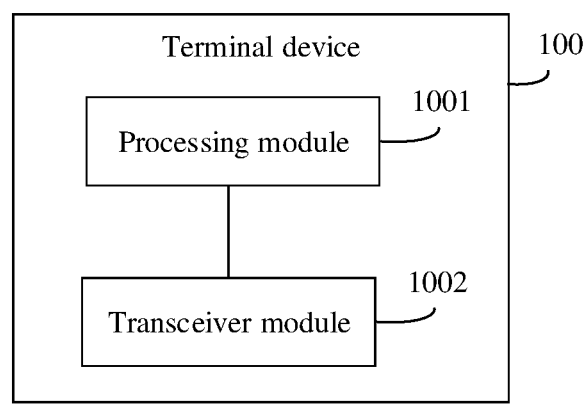
FIG. 10 is a schematic diagram of a structure of a terminal device according to an embodiment of this application.

For example, the communication apparatus is the terminal device in the foregoing method embodiments. FIG. 10 is a schematic diagram of a structure of a terminal device 100. The terminal device 100 supports a first user identity and a second user identity, and the terminal device 100 includes a processing module 1001 and a transceiver module 1002. The transceiver module 1002 may also be referred to as a transceiver unit, and is configured to implement a transceiver function. For example, the transceiver module 1002 may be a transceiver circuit, a transceiver, a transceiver, or a communication interface.

The processing module 1001 is configured to obtain first information or second information. The transceiver module 1002 is configured to send the first information or the second information to a first access network device by using the second user identity.

In a possible implementation, the transceiver module 1002 is further configured to: send an RRC setup request message to the first access network device by using the second user identity, and receive an RRC setup message from the first access network device by using the second user identity. Correspondingly, that the transceiver module 1002 is configured to send the first information or the second information to a first access network device by using the second user identity specifically includes: The transceiver module 1002 is configured to send an RRC setup complete message to the first access network device by using the second user identity, where the RRC setup complete message carries the first information or the second information.

Alternatively, in another possible implementation, the transceiver module 1002 is further configured to: send an RRC resume request message to the first access network device by using the second user identity, and receive an RRC resume message from the first access network device by using the second user identity. Correspondingly, that the transceiver module 1002 is configured to send the first information or the second information to a first access network device by using the second user identity specifically includes: The transceiver module 1002 is configured to send an RRC resume complete message to the first access network device by using the second user identity, where the RRC resume complete message carries the first information or the second information.

Alternatively, in still another possible implementation, that the transceiver module 1002 is configured to send the first information or the second information to a first access network device by using the second user identity includes: The transceiver module 1002 is configured to: when information about a serving cell of the first user identity is changed, send user equipment assistance information to the first access network device by using the second user identity, where the user equipment assistance information carries the first information or the second information.

All related content of the steps in the foregoing method embodiments may be referenced to function descriptions of a corresponding function module, and details are not described herein again.

In this embodiment, the terminal device 100 is presented in a form of function modules obtained through division in an integrated manner. Herein, the "module" may be a specific ASIC, a circuit, a processor that executes one or more software or firmware programs and a memory, an integrated logic circuit, and/or another component that can provide the foregoing functions. In a simple embodiment, a person skilled in the art may figure out that the terminal device 100 may be in the form of the communication apparatus 40 shown in FIG. 4.

For example, the processor 401 in the communication apparatus 40 shown in FIG. 4 may invoke the computer-executable instructions stored in the memory 403, to enable the communication apparatus 40 to perform the communication method in the foregoing method embodiments.

Specifically, functions/implementation processes of the processing module 1001 and the transceiver module 1002 in FIG. 10 may be implemented by the processor 401 in the communication apparatus 40 shown in FIG. 4 by invoking the computer-executable instructions stored in the memory 403. Alternatively, functions/implementation processes of the processing module 1001 in FIG. 10 may be implemented by the processor 401 in the communication apparatus 40 shown in FIG. 4 by invoking the computer-executable instructions stored in the memory 403. Functions/implementation processes of the transceiver module 1002 in FIG. 10 may be implemented by using the communication interface 404 in the communication apparatus 40 shown in FIG. 4.

The terminal device 100 provided in this embodiment may perform the communication methods. Therefore, for a technical effect that can be achieved by the terminal device 100, refer to the foregoing method embodiments. Details are not described herein again.

Figure 11:
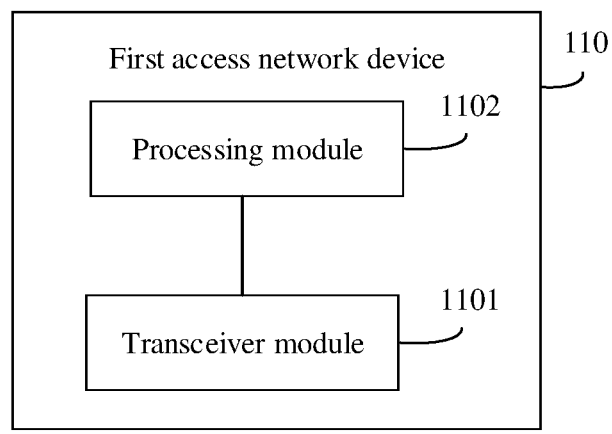
FIG. 11 is a schematic diagram of a structure of a first access network device according to an embodiment of this application.

Alternatively, for example, the communication apparatus is the first access network device in the foregoing method embodiments. FIG. 11 is a schematic diagram of a structure of a first access network device no. The terminal device no includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, a transceiver, or a communication interface.

The transceiver module 1101 is configured to receive first information or second information sent by a terminal device by using a second user identity, where the terminal device supports a first user identity and the second user identity. The processing module 1102 is configured to determine, based on the first information or the second information, whether to add a first cell as a serving cell of the second user identity.

In a possible implementation, the processing module 1102 is specifically configured to: determine at least one first band based on the first information, where the at least one first band includes a band corresponding to each of at least one serving cell of the first user identity; and determine, based on a band combination list supported by the terminal device, the at least one first band, at least one second band, and a third band corresponding to the first cell, whether to add the first cell as the serving cell of the second user identity.

Alternatively, in another possible implementation, when the second information includes a band combination list supported by the second user identity, the processing module 1102 is specifically configured to: determine, based on the band combination list supported by the second user identity, at least one second band, and a third band corresponding to the first cell, whether to add the first cell as the serving cell of the second user identity.

Alternatively, in still another possible implementation, when the second information includes a band list supported by the second user identity, the processing module 1102 is specifically configured to: determine whether a third band corresponding to the first cell exists in the band list supported by the second user identity; and if the third band exists in the band list supported by the second user identity, determine to use the first cell as a target serving cell to which the second user identity is to be handed over; or if the third band does not exist in the band list supported by the second user identity, determine not to use the first cell as a target serving cell to which the second user identity is to be handed over.

Alternatively, in yet another possible implementation, the processing module 1102 is specifically configured to: determine at least one first band based on the first information, where the at least one first band includes a band corresponding to each of at least one serving cell of the first user identity; determine whether a band combination consisting of the at least one first band and a third band corresponding to the first cell exists in a band combination list supported by the terminal device; and if the band combination exists in the band combination list supported by the terminal device, determine to use the first cell as a target serving cell to which the second user identity is to be handed over; or if the band combination does not exist in the band combination list supported by the terminal device, determine not to use the first cell as a target serving cell to which the second user identity is to be handed over.

Optionally, the transceiver module 1101 is further configured to send a handover request message to a second access network device, where the handover request message carries the first information or the second information, and the second access network device is a target access network device to be accessed by the terminal device by using the second user identity.

In a possible implementation, the transceiver module 1101 is further configured to: receive an RRC setup request message sent by the terminal device by using the second user identity, and send an RRC setup message to the terminal device. Correspondingly, that the transceiver module 1101 is configured to receive first information or second information sent by a terminal device by using a second user identity specifically includes: The transceiver module 1101 is configured to receive an RRC setup complete message sent by the terminal device by using the second user identity, where the RRC setup complete message carries the first information or the second information.

Alternatively, in another possible implementation, the transceiver module 1101 is further configured to: receive an RRC resume request message sent by the terminal device by using the second user identity, and send an RRC resume message to the terminal device. Correspondingly, that the transceiver module 1101 is configured to receive first information or second information sent by a terminal device by using a second user identity specifically includes: The transceiver module 1101 is configured to receive an RRC resume complete message sent by the terminal device by using the second user identity, where the RRC resume complete message carries the first information or the second information.

Alternatively, in still another possible implementation, that the transceiver module 1101 is configured to receive first information or second information sent by a terminal device by using a second user identity specifically includes: The transceiver module 1101 is configured to receive user equipment assistance information sent by the terminal device by using the second user identity, where the user equipment assistance information carries the first information or the second information.

All related content of the steps in the foregoing method embodiments may be referenced to function descriptions of a corresponding function module, and details are not described herein again.

In this embodiment, the first access network device no is presented in a form of function modules obtained through division in an integrated manner. Herein, the "module" may be a specific ASIC, a circuit, a processor that executes one or more software or firmware programs and a memory, an integrated logic circuit, and/or another component that can provide the foregoing functions. In a simple embodiment, a person skilled in the art may figure out that the first access network device no may be in the form of the communication apparatus 40 shown in FIG. 4.

For example, the processor 401 in the communication apparatus 40 shown in FIG. 4 may invoke the computer-executable instructions stored in the memory 403, to enable the communication apparatus 40 to perform the communication method in the foregoing method embodiments.

Specifically, functions/implementation processes of the processing module 1102 and the transceiver module 1101 in FIG. 11 may be implemented by the processor 401 in the communication apparatus 40 shown in FIG. 4 by invoking the computer-executable instructions stored in the memory 403. Alternatively, functions/implementation processes of the processing module 1102 in FIG. 11 may be implemented by the processor 401 in the communication apparatus 40 shown in FIG. 4 by invoking the computer-executable instructions stored in the memory 403. Functions/implementation processes of the transceiver module 1101 in FIG. 11 may be implemented by using the communication interface 404 in the communication apparatus 40 shown in FIG. 4.

The first access network device 110 provided in this embodiment may perform the communication methods. Therefore, for a technical effect that can be achieved by the first access network device 110, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a SoC (system-on-a-chip) or an ASIC, or may be an independent semiconductor chip. The processor includes a core for executing software instructions to perform operations or processing, and may further include a necessary hardware accelerator, for example, a field programmable gate array (FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (where for example, the communication apparatus may be a chip or a chip system). The communication apparatus includes a processor, configured to implement the method according to any one of the foregoing method embodiments. In a possible design, the communication apparatus further includes a memory. The memory is configured to store necessary program instructions and data. The processor may invoke program code stored in the memory, to indicate the communication apparatus to perform the method according to any one of the foregoing method embodiments. Certainly, the memory may alternatively not be located in the communication apparatus. When the communication apparatus is the chip system, the communication apparatus may include a chip, or may include the chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions listed in the claims. Some measures are recorded in dependent claims that are different from each other, but this does not mean that these measures cannot be combined to produce a better effect.

Although this application is described with reference to specific features and the embodiments thereof. It is clear that, various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   obtaining, by a terminal device, first information or second information, wherein the terminal device supports a first user identity and a second user identity, the first information comprises information about a serving cell of the first user identity, and the second information comprises a band combination list or a band list supported by the second user identity;
   detecting, at the terminal device, changed information associated with the serving cell of the first user identity or a serving cell of the second user identity, wherein the first information or the second information comprises the changed information; and
   sending, by the terminal device and by a second protocol stack corresponding to the second user identity, the first information or the second information to a first access network device using the second user identity, wherein the sending is triggered by a first protocol stack corresponding to the first user identity in response to detecting the changed information, and the first access network device is accessed by the terminal device using the second user identity.

2. The method according to claim 1, further comprising:
   sending, by the terminal device, a radio resource control (RRC) setup request message to the first access network device using the second user identity; and
   receiving, by the terminal device, an RRC setup message from the first access network device using the second user identity; and
   wherein sending, by the terminal device, the first information or the second information to the first access network device using the second user identity comprises:
      sending, by the terminal device, an RRC setup complete message to the first access network device using the second user identity, wherein the RRC setup complete message carries the first information or the second information; or
      sending, by the terminal device, an RRC resume complete message to the first access network device using the second user identity, wherein the RRC resume complete message carries the first information or the second information.

3. The method according to claim 1, wherein sending, by the terminal device, the first information or the second information to the first access network device using the second user identity comprises:
   when the information about the serving cell of the first user identity is changed, sending, by the terminal device, user equipment assistance information to the first access network device using the second user identity, wherein the user equipment assistance information carries the first information or the second information.

4. The method according to claim 1, wherein the information about the serving cell of the first user identity comprises third information of each serving cell of the first user identity, and the third information comprises at least one of the following information: band information, a synchronization signal block (SSB) frequency, cell identifier information, bandwidth information, bandwidth part (BWP) configuration information, or radio resource control (RRC) status information.

5. A method, comprising:
   receiving, by a first access network device and by a second protocol stack corresponding to a second user identity upon triggering by a first protocol stack corresponding to a first user identity in response to detecting changed information associated with a serving cell of the first user identity or a serving cell of the second user identity, first information or second information sent by a terminal device using the second user identity, wherein the terminal device supports the first user identity and the second user identity, the first information comprises information about the serving cell of the first user identity, and the second information comprises a band combination list supported by the second user identity or a band list supported by the second user identity, and the first information or the second information comprises the changed information; and
   performing the following:
      determining, by the first access network device based on the first information or the second information, whether to add a first cell as the serving cell of the second user identity; or
      determining, by the first access network device based on the first information or the second information, whether to use the first cell as a target serving cell to which the second user identity is to be handed over.

6. The method according to claim 5, wherein determining, by the first access network device based on the first information, whether to add the first cell as the serving cell of the second user identity comprises:
   determining, by the first access network device, at least one first band based on the first information, wherein the at least one first band comprises a band corresponding to each serving cell of at least one serving cell of the first user identity; and
   determining, by the first access network device based on a band combination list supported by the terminal device, the at least one first band, at least one second band, and a third band corresponding to the first cell, whether to add the first cell as the serving cell of the second user identity, wherein the at least one second band comprises a band corresponding to each serving cell of at least one serving cell of the second user identity.

7. The method according to claim 5, wherein the second information comprises the band combination list supported by the second user identity, and determining, by the first access network device based on the second information, whether to add the first cell as the serving cell of the second user identity comprises:
   determining, by the first access network device based on the band combination list supported by the second user identity, at least one second band, and a third band corresponding to the first cell, whether to add the first cell as the serving cell of the second user identity, wherein the at least one second band comprises a band corresponding to each serving cell of at least one serving cell of the second user identity.

8. The method according to claim 5, wherein the second information comprises the band list supported by the second user identity, and determining, by the first access network device based on the first information or the second information, whether to use the first cell as the target serving cell to which the second user identity is to be handed over comprises:
   determining, by the first access network device, whether a third band corresponding to the first cell exists in the band list supported by the second user identity; and performing the following:
    when it is determined that the third band exists in the band list supported by the second user identity, determining, by the first access network device, to use the first cell as the target serving cell to which the second user identity is to be handed over; or
    when it is determined that the third band does not exist in the band list supported by the second user identity, determining, by the first access network device, not to use the first cell as the target serving cell to which the second user identity is to be handed over.

9. The method according to claim 5, wherein determining, by the first access network device based on the first information, whether to use the first cell as the target serving cell to which the second user identity is to be handed over comprises:
    determining, by the first access network device, at least one first band based on the first information, wherein the at least one first band comprises a band corresponding to each serving cell of at least one serving cell of the first user identity;
    determining, by the first access network device, whether a band combination consisting of the at least one first band and a third band corresponding to the first cell exists in a band combination list supported by the terminal device; and
    performing the following:
        when it is determined that the band combination exists in the band combination list supported by the terminal device, determining, by the first access network device, to use the first cell as the target serving cell to which the second user identity is to be handed over; or
        when it is determined that the band combination does not exist in the band combination list supported by the terminal device, determining, by the first access network device, not to use the first cell as the target serving cell to which the second user identity is to be handed over.

10. An apparatus, comprising:
    one or more processors; and
    a memory storing instructions that are executable by the one or more processors, wherein the instructions include instructions that, when executed, cause the one or more processors to execute operations comprising:
        obtaining first information or second information, wherein the first information comprises information about a serving cell of a first user identity, and the second information comprises a band combination list or a band list supported by a second user identity, and wherein the apparatus supports the first user identity and the second user identity;
        detecting changed information associated with the serving cell of the first user identity or the serving cell of the second user identity, wherein the first information or the second information comprises the changed information; and
        sending, by a second protocol stack corresponding to the second user identity, the first information or the second information to a first access network device using the second user identity, wherein the sending is triggered by a first protocol stack corresponding to the first user identity in response to detecting the changed information, and the first access network device is accessed by the apparatus using the second user identity.

11. The apparatus according to claim 10, wherein the instructions include further instructions that, when executed, cause the one or more processors to execute operations comprising:
    sending a radio resource control (RRC) setup request message to the first access network device using the second user identity, and receiving an RRC setup message from the first access network device using the second user identity; and
    wherein the instructions that, when executed, cause the one or more processors to execute operations comprising sending the first information or the second information to the first access network device using the second user identity, comprise instructions that, when executed, cause the one or more processors to execute operations comprising:
        sending an RRC setup complete message to the first access network device using the second user identity, wherein the RRC setup complete message carries the first information or the second information.

12. The apparatus according to claim 10, wherein the instructions include further instructions that, when executed, cause the one or more processors to execute operations comprising:
    sending a radio resource control (RRC) resume request message to the first access network device using the second user identity, and receiving an RRC resume message from the first access network device by using the second user identity; and
    wherein the instructions that, when executed, cause the one or more processors to execute operations comprising sending the first information or the second information to the first access network device using the second user identity, comprise instructions that, when executed, cause the one or more processors to execute operations comprising:
        sending an RRC resume complete message to the first access network device using the second user identity, wherein the RRC resume complete message carries the first information or the second information.

13. The apparatus according to claim 10, wherein the instructions that, when executed, cause the one or more processors to execute operations comprising sending the first information or the second information to the first access network device using the second user identity, comprise instructions that, when executed, cause the one or more processors to execute operations comprising:
    when the information about the serving cell of the first user identity is changed, sending user equipment assistance information to the first access network device using the second user identity, wherein the user equipment assistance information carries the first information or the second information.

14. The apparatus according to claim 10, wherein the information about the serving cell of the first user identity comprises third information of each serving cell of the first user identity, and the third information comprises at least one of the following information: band information, a synchronization signal block (SSB) frequency, cell identifier information, bandwidth information, bandwidth part (BWP) configuration information, or radio resource control (RRC) status information.

15. An apparatus, comprising:
    one or more processors; and
    a memory storing instructions that are executable by the one or more processors, wherein the instructions include instructions that, when executed, cause the one or more processors to execute operations comprising:
receiving first information or second information sent by a terminal device using a second protocol stack corresponding to a second user identity in response to detecting changed information associated with a serving cell of a first user identity or a serving cell of the second user identity, wherein the terminal device supports the first user identity and the second user identity, the first information comprises information about the serving cell of the first user identity, the first user identity corresponding to a first protocol stack that triggers sending of the first information or the second information from the terminal device to the apparatus, and the second information comprises a band combination list or a band list supported by the second user identity; and
determining, based on the first information or the second information, whether to add a first cell as the serving cell of the second user identity.

16. The apparatus according to claim 15, wherein the instructions include further instructions that, when executed, cause the one or more processors to execute operations comprising:
determining at least one first band based on the first information, wherein the at least one first band comprises a band corresponding to each serving cell of at least one serving cell of the first user identity; and
determining, based on a band combination list supported by the terminal device, the at least one first band, at least one second band, and a third band corresponding to the first cell, whether to add the first cell as the serving cell of the second user identity, wherein the at least one second band comprises a band corresponding to each serving cell of at least one serving cell of the second user identity.

17. The apparatus according to claim 15, wherein the second information comprises the band combination list supported by the second user identity, and wherein the instructions include further instructions that, when executed, cause the one or more processors to execute operations comprising:
determining, based on the band combination list supported by the second user identity, at least one second band, and a third band corresponding to the first cell, whether to add the first cell as the serving cell of the second user identity, wherein the at least one second band comprises a band corresponding to each serving cell of at least one serving cell of the second user identity.

18. The apparatus according to claim 15, wherein the second information comprises the band list supported by the second user identity, and wherein the instructions include further instructions that, when executed, cause the one or more processors to execute operations comprising:
determining whether a third band corresponding to the first cell exists in the band list supported by the second user identity; and
performing the following:
when it is determined that the third band exists in the band list supported by the second user identity, determining to use the first cell as a target serving cell to which the second user identity is to be handed over; or
when it is determined that the third band does not exist in the band list supported by the second user identity, determining not to use the first cell as the target serving cell to which the second user identity is to be handed over.

19. The apparatus according to claim 15, wherein the instructions include further instructions that, when executed, cause the one or more processors to execute operations comprising:
determining at least one first band based on the first information, wherein the at least one first band comprises a band corresponding to each serving cell of at least one serving cell of the first user identity; and
determining whether a band combination consisting of the at least one first band and a third band corresponding to the first cell exists in a band combination list supported by the terminal device; and
performing the following:
when it is determined that the band combination exists in the band combination list supported by the terminal device, determining to use the first cell as a target serving cell to which the second user identity is to be handed over; or
when it is determined that the band combination does not exist in the band combination list supported by the terminal device, determining not to use the first cell as the target serving cell to which the second user identity is to be handed over.

* * * * *